US006980934B1

(12) United States Patent
Sadovnik

(10) Patent No.: US 6,980,934 B1
(45) Date of Patent: Dec. 27, 2005

(54) METHOD AND SYSTEMS FOR NESTING OBJECTS

(76) Inventor: Isaac Sadovnik, 117 Brackett Rd., Newton, MA (US) 02158

( * ) Notice: Subject to any disclaimer, the term of this patent is extended or adjusted under 35 U.S.C. 154(b) by 0 days.

(21) Appl. No.: 09/581,095

(22) PCT Filed: Dec. 11, 1998

(86) PCT No.: PCT/US98/26384

§ 371 (c)(1),
(2), (4) Date: Dec. 18, 2000

(87) PCT Pub. No.: WO99/29479

PCT Pub. Date: Jun. 17, 1999

Related U.S. Application Data

(60) Provisional application No. 60/069,561, filed on Dec. 12, 1997.

(51) Int. Cl.$^{7}$ .............................................. G06F 17/50
(52) U.S. Cl. .......................... 703/1; 206/505; 206/507
(58) Field of Search ............................ 703/1; 700/192, 700/213; 206/505, 507, 519; 108/55.3

(56) References Cited

U.S. PATENT DOCUMENTS

| | | | | |
|---|---|---|---|---|
| 4,794,742 A * | 1/1989 | Henderson | .................. | 52/80.2 |
| 5,050,090 A * | 9/1991 | Golub et al. | ................ | 700/217 |
| 5,363,309 A * | 11/1994 | Tong Loh | ................... | 700/192 |
| 5,886,902 A * | 3/1999 | Turrini | .......................... | 703/2 |

* cited by examiner

*Primary Examiner*—Albert W. Paladini
(74) *Attorney, Agent, or Firm*—McDermott Will & Emery LLP

(57) ABSTRACT

The present invention is in the field of manufacturing, processing and design, and also packaging. Nesting is the process of placing objects together with minimal spaces between them. The invention is described below in two forms. The first form, set forth in Part I below, is directed to methods and systems for nesting of two dimensional (2D) objects in a target plane. The second form, set forth in Part II below, is directed to methods and systems for nesting three dimensional (3D) objects in a target volume. The specific details of the preferred embodiments are set forth in those respective parts.

6 Claims, 15 Drawing Sheets

Ideal Utilization Ratio = .8397
RBMedEyestay RBMedEyestay
Target Utilization Ratio = .7336
for a 3m X 1m Sheet
Target Utiliz for a 5m X 1m = .7612

Ideal Utilization Ratio = .8201
RBTip RBTip
Target Utilization Ratio = .7813
for a 3m X 1m Sheet
Target Utiliz for a 5m X 1m = .7943

Number of Nests/PTiles Kept = 10
Utilization Ratio = 0.406

METHOD AND SYSTEMS FOR NESTING OBJECTS

FIELD OF THE INVENTION

The present invention is in the field of manufacturing processing and more particularly relates to methods and systems for nesting of two dimensional objects. Nesting is the process of placing objects together with minimal space between them.

BACKGROUND OF THE INVENTION

There are many design and manufacturing processes in which substantially two dimensional parts-to-be-assembled are initially laid out on and then cut from planar or sheet stock. For example, leather shoes, clothing, pocketbooks, and automobile and furniture upholstery are often formed from a plurality of panels, or parts, cut from a cowhide. After cutting of the panels for such an article, conventional seam joining techniques, such as sewing, are used to assemble the panels to form the finished article. Clothing, upholstery and many other articles of other materials are similarly designed and manufactured in a similar manner. Such other articles include body parts for automobiles, for example, hoods or fenders, which may be stamped from metal sheets, and then subsequently shaped to form the final part configuration. Numerous other articles are similarly manufactured from planar sheets as well.

In the manufacture of all of these parts, it is important to minimize the waste which remains after the parts are cut from the sheet stock. While in some cases, where the waste can be re-used, such as in the case of sheet metal, this factor is of lesser importance, there are many cases where the minimization of waste is of critical importance to the commercial viability of a product. The latter cases particularly include shoe manufacture, where the cost of materials, for example cowhides or synthetic materials, is very high.

In view of such cost considerations, manufacturing processes generally include attempts to minimize waste. However, the conventional attempts at such minimization have been relatively ineffective. In the leather shoe industry, for example, parts are often manually die cut from cowhides, where the die is manually placed on the hide by skilled (or relatively unskilled) workers, typically resulting in maximum yields in the 50–60% range for the typical irregularly shaped parts. In recent years, computer controlled layout of parts on a hide have been achieved, resulting in typical yields as high as the 60–70% range.

In U.S. Pat. No. 4,210,041, the present inventors disclosed a method for laying out, or nesting, a plurality of identical irregular non-polygonal rounded pieces on a parallel edge-bounded sheet material with relatively little waste. In accordance with the method of that patent, the salient points of the part boundary are connected by straight lines to box the part boundary in a plane polygonal figure. Then, pairs of such plane polygonal figures are pairwise positioned to within a plane closed parallelogram. Finally, a plurality of such parallelogram are arranged side-by-side to define a multiple repeat pattern of objects equal in width to the planar sheet from which the parts are to be cut. A nest constructed in accordance with U.S. Pat. No. 4,210,041 does offer improvement in nesting over prior art techniques; however, the resulting nests are still less than optimal.

It is an object of the present invention to provide an improved method and system for defining a nest of two dimensional objects.

It is another object to provide an improved method and apparatus for cutting a plurality of two dimensional parts form a sheet with high yield.

SUMMARY OF THE INVENTION

The invention is a method and system for defining placement of a plurality of two-dimensional objects on a target planar surface with minimal void space between them. The invention automatically packs the maximum number of irregular parts possible (preferably, of up to two different shapes) with minimum wasted surface area. The invention uses a heuristical approach, so that intelligent decisions are made in order to carry only a small percentage of intermediate solutions to completion. In typical cases, this enables the computation time used in the nesting process to be reduced from hours to minutes, allowing for a more interactive nesting design environment.

The invention uses a combination of topology analysis and numerical iteration to determine an efficient layout in short computation times. The process commences by defining a first sub-nest in a central part of the target, grouping parts to each other, and then "grows" or extends outward toward the boundaries of the target. The resultant layouts are generally parallelogramic and thus angled in nature. The "angled" layout is contrary to conventional rectangular (90 degree) nesting practice. A heuristic approach is used with an interactive process to curtail long computation times and to produce nested layouts much faster.

The nesting method and system of the invention maximizes material utilization from the "center outwards" by minimizing the voids between nested parts. In contrast, conventional nesting practice first defines a target area and then fits parts starting from one edge and "flowing" parts across the target area until the opposite edge is reached.

The heuristics used to curtail long computation times, are intermediate measures of how good a nest is. As the process proceeds from one stage to the next, measures of nesting effectiveness are calculated and only a small percentage of all the possibilities are allowed to continue to higher stages. This "nest culling" heuristical process is effective in substantially reducing computation times. By allowing only the best intermediate nests to proceed to the "tiling" stages, layout times are typically reduced with no practical loss in nesting efficiency.

In one form, the invention is a 2D method defining a packing configuration for a plurality of two dimensional (2D) objects in a target plane. The method comprises the computer generated steps of (and a system for performing those steps):

A. generating signals defining each of said 2D objects with respect to an object coordinate system having orthogonal axes $X_0$ and $Y_0$, in terms of a plurality of points representative of boundary points on said objects, B. associating two of said objects to define an object pair, C. generating a nest signal representation of said objects of said object pair nested with respect to a nest coordinate system having orthogonal axes $X_N$ and $Y_N$, to define a plurality of close-packed candidate nests in which the pairwise positions of two said objects of each candidate nest are characterized by relatively small planar spaces between the respective objects, D. selecting a subset of said candidate nests in accordance with predetermined nest criteria, E. for each of said selected candidate nests, generating a tile signal representative of two such nests tiled with respect to a tile coordinate system having orthogonal axes $X_T$ and $Y_T$, said tiling steps including the sub steps of:

i. generating a primary tile signal representative of said two nests tiled with respect to said $X_T$ axis by translating said nests with relative motion in the direction of said $X_T$ and $Y_T$ axes, to define a plurality of candidate primary tiles in which the pairwise positions of said two nests of each candidate primary tile are characterized by relatively small planar spaces between said nests, ii. selecting a subset of said candidate primary tiles in accordance with predetermined primary tile criteria, iii. for each of said selected primary tiles, generating a secondary tile signal representative of a nest and said primary tile tiled with respect to said $Y_T$ axis by translating said nest with respect to said primary tile with relative motion in the direction of said $X_T$ and $Y_T$ axes, to define a plurality of candidate secondary tiles in which the pairwise positions of said nest and said primary tile are characterized by relatively small planar spaces between said nest and the nests of said primary tile, iv. selecting one of said candidate secondary tiles in accordance with predetermined secondary tile criteria, thereby defining the optimal nest and primary tile, said optimal nest defining said packing configuration.

In one form the 2D method further comprises the further steps of:

F. generating an initial tile signal representative of an initial secondary tile positioned in said target plane at a position other than adjacent the boundary of said target plane, and G. generating an area packing signal representative of said initial tile as augmented additional secondary tile extending successively from said initial secondary tile in the direction of each of said $X_T$, and $Y_T$ axes, whereby adjacent secondary tiles are substantially identically pairwise configured in said target plane in the direction of said $X_T$ and $Y_T$ axes.

In another form, the invention is a method of defining a packing configuration for a plurality of three dimensional (3D) objects in a target volume. In this form, the invention comprises the computer generated steps of (and a system fro performing those steps):

A. generating an object signal defining each of said 3D objects with respect to an object coordinate system having orthogonal axes $X_0$, $Y_0$ and $Z_0$, in terms of a plurality of points representative of boundary points on said objects, B. associating two of said objects to define an object pair, C. generating a nest signal representative of said objects of said object pair nested with respect to a nest coordinate system having orthogonal axes $X_N$, $Y_N$ and $Z_N$, to define a plurality of close-packed candidate nests in which the pairwise positions of said objects of each candidate nest are characterized by relatively small volumetric spaces between the respective objects, D. selecting a subset of said candidate nests in accordance with predetermined nest criteria, E. for each of said selected candidate nests, generating a tile signal representative of two of said nests tiled with respect to a tile coordinate system having orthogonal axes $X_T$, $Y_T$ and $Z_T$, said tile generating step including the sub steps of:

i. generating a primary tile signal representative of said two nests tiled with respect to said $X_T$ axis by translating said nests with relative motion in the direction of said $X_T$, $Y_T$ and $Z_T$ axes, to define a plurality of candidate primary tiles in which the pairwise positions of said two nests of each candidate primary tile are characterized by relatively small volumetric spaces between said nests, ii. selecting a subset of said candidate primary tiles in accordance with predetermined primary tile criteria, iii. for each of said selected primary tiles, generating a secondary tile signal representative of one of said nests of said primary tiles and said primary tile tiled with respect to said $Y_T$ axis by translating said nest with respect to said primary tile with relative motion in the direction of said $X_T$, $Y_T$ and $Z_T$ axes, to define a plurality of candidate secondary tiles in which the pairwise positions of said nest and said primary tile are characterized by relatively small volumetric spaces between said nest and the nests of said primary tile, iv. selecting one of said candidate secondary tiles in accordance with predetermined secondary tile criteria, v. for each of said selected secondary tiles, generating a tertiary tile signal representative of two of said secondary tiles tiled with respect to said $Z_T$ axis by translating said secondary tiles with respect to each other with relative motion of in the direction of said $X_T$, $Y_T$, and $Z_T$ axes to define a plurality of tertiary tiles in which the pairwise positions of said secondary tiles are characterized by relatively small volumetric spaces between said secondary tiles, vi. selecting one of said tertiary tiles from said candidate tertiary tiles in accordance with predetermined tertiary tile criteria, thereby defining an optimal nest of said primary tile and said secondary tile, said optimal nest defining said packing configuration.

In another form the 3D method further comprises the further step of

F. generating an initial tile signal representative of an initial tertiary tile positioned in said target volume at a position other than adjacent the boundary of said target volume, and G. generating a volume packing signal representative of said initial tile as augmented additional tertiary tiles extending successively from said initial tertiary tile in the direction of each of said $X_T$, $Y_T$, and $Z_T$ axes, whereby adjacent tertiary tiles are substantially identically pairwise configured in said target volume in the direction of said $X_T$, $Y_T$, and $Z_T$ axes.

BRIEF DESCRIPTION OF THE DRAWINGS

The foregoing and other object of this invention, the various features thereof, as well as the invention itself, may be more fully understood from the following description, when read together with the accompanying drawings in which.

DESCRIPTION OF THE PREFERRED EMBODIMENT

Figure 1:
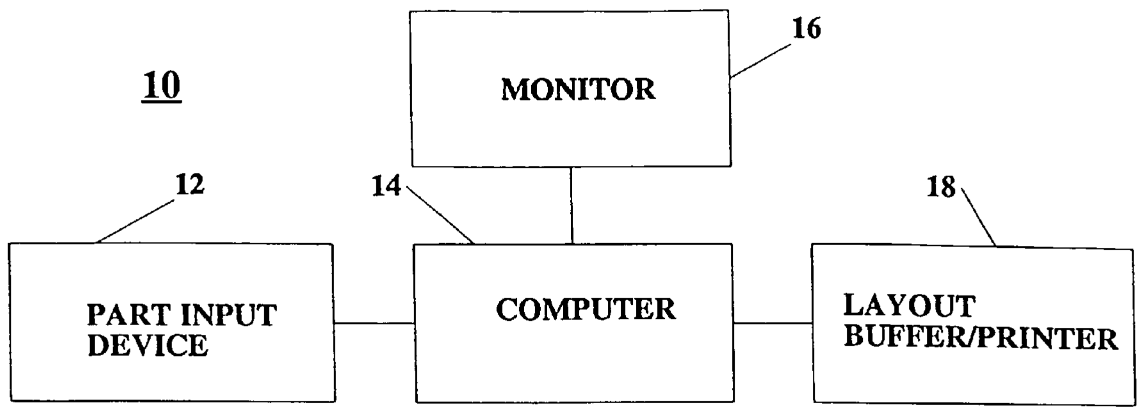
FIG. 1 shows a block diagram of a system in accordance with the invention.

A system 10 embodying the invention is shown in FIG. 1. The system 10 includes a part input device 12 a programmed digital computer 14 with an associated display 16 and an output layout buffer printer 18. The part input device 12 may be a conventional computer running a computer aided design program, such as AutoCad. The computer may be an IBM type Pentium-based or an Apple PowerPC-based personal computer (with a conventional monitor for display 16) programmed to perform the process of the invention. The layout buffer 18 may include a conventional storage medium for storing the layouts determined by the programmed digital computer 12.

The following description sets forth how two dimensional (2D) parts are input and defined and how their areas are computed. Data structures are then defined that hold the nesting and tiling information as well as the measure for their incremental effectiveness (permitting use of the heuristics) along the process. Finally, the following sequential steps in the procedure: (1) Nesting, (2) Primary Tiling, (3) Secondary Tiling, and (4) Layout.

The computer 12 uses a program that compresses 2D irregular figures (from device 12) onto a target stock area, with minimum area wasted between the figures. The program combines geometric analysis of the parts to be laid out and numerical iteration for exhaustiveness. As a main feature of the process, the pats are nested into parallelogramic orientations and not rectangular orientations (the traditional method). This flexibility in orientation allow a larger compression of the parts and a lesser waste of material stock. In the preferred embodiment this computer program nests only two different geometrical shapes, and then "tiles" those nested pairs. The program also performs "nest culling" to avoid unnecessary computation. Major tasks performed in the invention are:

Task 1: Define and implement input of the geometry of parts (components) and the target.

Task 2: Provide an intersection algorithm/process.

Task 3: Add multiple numerical iteration loops for the various nesting/tiling steps.

Task 4: Implement measurement of nesting success as void areas and nest extent areas.

Task 1:

The component parts (to be nested) and the target (upon which the parts are nested) are defined in two dimensional space. In this illustrated embodiment, a part can be "drawn" in the two dimensional computer screen of monitor 16 and the computer 14 then stores this information as a list of x-y coordinates for the vertices of the boundary of a piecewise linear model of the part. In other words, the parts are defined as multisided polygons. These polygons can typically have 10's or 100's of sides depending on the complexity of the figure (curvature of its sides) and the required accuracy of the nesting solution. As a result, parts are stored in files which consist of a 2 column table of x,y coordinate pairs for all the vertices of the part.

Task 2:

The intersection procedure checks for collisions between parts which may be considered to translate in two dimensional space. This is done in two dimensions by computing the smallest distance between all the vertices of a part number 1 $(x_1,y_1)$ and a part number 2 $(x_2,y_2)$. This is $((x_2^2-x^2_1)+(y_2^2-y_1^2))^{1/2}$. In addition, this check for collisions is done between every "peripheral node" of component 1 with every "peripheral node" of part 2. Once that smallest distance is obtained, it is subtracted from every node on one of the parts into what constitutes the translation of this part toward the other one until the two parts basically "touch" each other in the two dimensional space.

The intersection procedure constitutes a translation in a particular direction which is not controlled by the user, but is determined by the way the parts are placed in the "working area". In order to control the directionality of the "approach/collision" process, the intersection of part 1 vertices with part 2 sides and part 2 vertices with part 1 sides is determined. The computation of vertex-to-side distances is somewhat more involved and is described below in connection with the nesting section of the process. In addition "minimum distance part-to-part approaches" are done in the X (horizontal) direction. Directionality is achieved by rotating the parts, nests or tiles a specified angle.

Task 3:

The nesting and tiling steps have "primary" and "secondary" moves. These moves are made so as to bring two parts or two nests close to each other in order to package them as tightly as possible. The primary move is made in the X direction. The parts (or nests) are placed side by side and then one of them is offset in the Y direction. The amount of this offset (from a maximum of the part's height to the negative of the part's height) constitutes the first iteration loop. In other words, the primary move is made for every Y offset. Once the primary move is made, the secondary move is performed in the Y direction. Then a rotation of the figures is performed for the appropriate angle (90 degrees in this case) so as to bring the approaching direction in the X direction. Then, the secondary move is performed again in the X direction. This primary/secondary move iteration loop is nested within a part side-to-side combination loop. This side-side-combination loop cycles through all the possible side-side combinations of the parts nested. In addition, after every X direction move (for both primary and secondary approaches), a "tangential" move is made in the direction of the intersecting vertex/side. Again the system is rotated by the appropriate angle and another X direction approach is performed. (This slides the vertex along the intersecting side for further compactness). Finally, within the primary/secondary and tangential moves, another loop is performed which cycles through all possible vertex-to-side combinations while looking for the minimum approach intersection process set forth under Task 3 above.

Task 4:

The necessary geometrical computations for the size of the nest are "Total Event" are determined in Task 4. Obtaining the area of an assembly of components is a straight forward calculation. The extent of the void areas between the components is determined. Typically, this is a relatively complex and computer intensive calculation. However, instead of computing nest's void areas, the preferred form of the invention calculates the "Partial Extent" of a nest. As set forth below, in the nesting section of the process description, this partial extent includes a measure of the area intersected between parts when forming a nest. This area saved is the inverse or complement of the void area proposed as a heuristic. This "intersection" saved area is much easier to calculate, and has similar bearing in terms of the effectiveness of a nest as the proposed wasted void area.

The success of the heuristic-based process for nest culling is evaluated, along with total extent and partial extent. These heuristics limit the number of nests passed to the primary tiling stage, and are also applied to the primary tiling passage to secondary tiling stage. This further limits the search tree and has dramatically improved the performance of the expensive (computer time-wise) tiling stage. A system of weighting factors is used for the two main heuristic variables, so as to ascertain the relative importance of one versus the other.

Computer Program Description

This section provides a brief description of the program used in computer 14.

The hardware platform is an Apple Power Macintosh computer with a 17" color monitor and laser printer. The CAD software used for this embodiment consists of two packages—Autodesk's AutoCAD and Graphsoft's MiniCAD. This embodiment was developed using the following combination of software tools: 1—Macintosh Programmer's Workship (MPW) for the development and coding environment (including editing and debugging); 2—FORTRAN Compiler for the compilation of the program; and 3—MiniCAD for the part input and output layout visualization. The CAD package allows ease in description on the parts, and interactive visualization of the layouts. Alternatively, AutoCAD could be used.

The inner regions of the nests have great importance in the invention (as opposed to the peripheral or edge regions near the target's boundaries.) The computation is segmented into four sequential steps: Nesting, Primary Tiling, Secondary Tiling, and Layout. The process is initiated with the nesting step, where two irregular objects or parts are taken and brought together until they "touch" each other on their periphery. This grouping of two parts is called a "nest". The parts are brought towards each other as close together as possible for form as compact as possible a nest. Depending on the complexity of the parts being nested, the computer program actually performs from many hundreds to many thousand different nests and ranks them according to their compactness (using heuristic variables previously described).

Once the nests are formed and ranked, a predetermined number of these nests (the ones that ranked highest) are passed to the primary tiling step. In this step two nests are brought together in the X direction to form a primary tile or "ptile". A ptile is made of two nests or four parts. The same rational is used to form a ptile as to form a nest. In other words, a grouping of two nests is created that forms the most compact unit. Typically, a few hundred ptiles are generated per each nest passed from the nesting step. These ptiles are consequently ranked using heuristic variables for compactness.

A small percentage of the ptiles formed (a predetermined number) are then passed onto the secondary tiling step. In this case, two ptiles are brought together in the Y direction to form a secondary tile or "stile". A stile is made up of two stiles or four nests or eight parts. Again, the same rational as before for nest formation is used, and in the process, over a thousand different stiles are generated for each of the ptiles passed onto this step form the primary tiling step. Finally, a simple layout routine takes the data generated for the best secondary tile and computes the ideal parallelogramic area needed to contain a single nest. A computation of the utilization ratio follows by calculating the actual part area and dividing that by the needed parallelogramic area. Then the layout routine creates a file with the CAD commands that generate the best layout for the parts nested.

A step by step description of the computer program will now be described, starting with a description of the parts and ending with a description of the computation steps: Nesting, Tiling and Layout.

Part Description

In order to describe and input parts in two dimensions, they are defined as polygons in the xy plane. Each polygon can be made of (typically) 100 to 1000 vertices described by x,y coordinate pairs. This method for part input enables description of parts in a simple way, which include curvatures, for the which small polygonal sides are used (vertices are very close together where the curvatures need to be described accurately).

Figure 2:
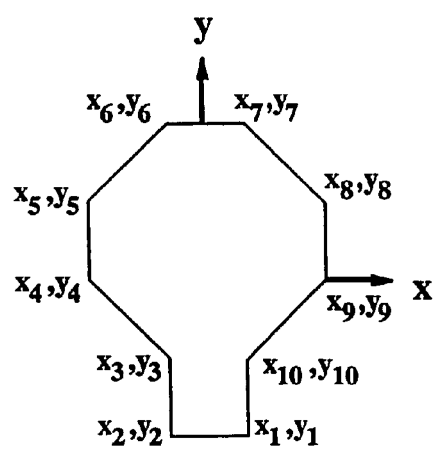
FIG. 2 shows an exemplary part to be nested.

As an example of this methodology, FIG. 2 shows an exemplary part, composed of ten vertices in the xy plane and labeled with coordinates $(x_1,x_2)$ through $(x_{10},y_{10})$. This simple figure is thus fully described with a set of 10 x,y coordinates pairs for a total of twenty numbers. The part description for the part of FIG. 2 is stored in a small text file with all the x,y coordinate pairs. Thus, design and input of parts is very simple using this mode.

Part Area Calculation

Part areas are calculated as three different areas: (1) the actual part area, (2) the total area extent for nests and tiles, and (3) the partial area extent for nests and tiles. The computation of the part area is straight forward. If $y_{min}$ is the smallest y coordinate, then the part area A is given by:

$$A = \sum_{i=0}^{Nv-1} 1/2(X_{i+1} - X_i)(Y_{i+1} + Y - 2Y_{\min})$$

where $N_v$ is the number of vertices, ($N_v$=10 in the case of the part of FIG. 2).

Figure 3:
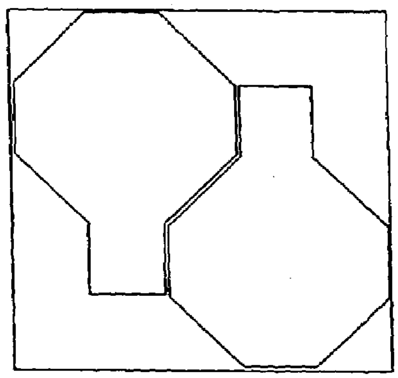
FIG. 3 shows the total nest extent for a nest of the part of FIG. 2.
Figure 4:
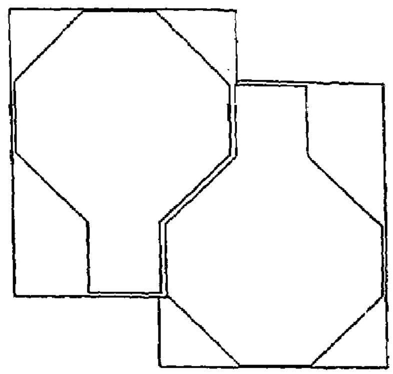
FIG. 4 shows the partial nest extent for a nest of the part of FIG. 2.

The total extent area is calculated as the smallest rectangle that can contain a particular nest or tile. This is illustrated in FIG. 3. This total area extent only involves the knowledge of the maximum and minimum x,y values for the parts within the nest or tile. The partial area extent illustrated in FIG. 4, is a more accurate measure of the actual area used by the individual parts within the nest or tile.

This partial extent is calculated by first computing the areas of the smallest rectangles encompassing individual parts and subtracting the "intersecting" area between the parts being grouped into the nest or tile. It is a smaller area than the total extent and it points more directly to a measure of part grouping compactness.

The two extents described above are used through out the various steps in the computer program as the two heuristic variables to determine the effectiveness of a particular nest or primary tile. Weighting factors are assigned as inputs to the computer program for these two extents so as to prefer one more to the other in the calculation. For the illustrated embodiment, both weights are 1.0 (but other values may be used) for nest and primary tile culling.

As an example of how these extents are computed, the following algorithms show these calculations for a nest made up of left and right parts (subscripts "l" and "r"). Here, min,max corresponds to the minimum, maximum coordinate a given part:

$TotExt=[max(xmax_l,xmax_r)-min(xmin_l,xmin_r)]*[max(ymax_l,ymax_r)-min(ymin_l,ymin_r)]$ $Ext_l=(xmax_l-xmin_l)*(ymax_l-ymin_l)$ $Ext_r=(xmax_r-xmin_r)*(ymax_r-ymin_r)$ $PartExt=Ext_l+Ext_r-[xmax_l-xmin_r]*[min(ymax_l,ymax_r)-max(ymin_l,ymin_r)]$ Basic Structures The computer program contains five storage structures, where all the data for the various characteristics of the parts, nests, tiles and layouts are accumulated. They are the /Part/, /Nest/, /Ptile/, /STile/ structures (denoted symbolically surrounded by slashes "/"). These variables are more completely described below. For reference, the variables within each structure are now briefly described:

/Part/

/Part/ contains variables for the storage of the following part characteristics:

1. Part name which correspond to the text file which stores the part's data
2. Number of vertices—$N_v$
3. The x-y coordinates for the minimum and maximum values—X min . . . Ymax
4. The X-Y arrays for the x-y coordinates of dimension $N_v$ /Nest/

/Nest/ contains variables for the storage of the following nest characteristics, each of which is dimensioned to (100) for the maximum number of possible nest that could be generated:

1. Left,Right part's side number—nsidel, nsider (an integer between 1–4)
2. The right part's displacement relative to the left part to form the nest—dxn,dyn
3. The total and partial extent for the nest—TotExtn, PartExten
4. The ranked sequence from best to worst nest—Seqncn
5. The total number of nests generated by the nesting step (not an array)—Nn /PTile/

/Ptile/ contains variables for storage of the following Primary tile characteristics, each of which is dimensioned to (50,10) for the maximum number of possible nests that are allowed to pass to the primary tiling step=50, and the maximum number of ptiles generated per each nest passed=10.

1. The right nest's displacement relative to the left nest, to form the primary tile—dxp,dyp
2. The total and partial extent for the ptile—TotExtp, PartExtp
3. The ranked sequence from best to worst ptile for both the nest passed and the ptile for that nest (singly dimensioned to (50)—Nseqncp,TSeqncp
4. The total number of ptiles generated by the primary tiling step for each nest passed to it (singly dimensioned to (50))—Np /Stile/

/Stile/ contains variables for the storage of the following Secondary tile characteristics, each of which is dimensioned to (50,1080) for the maximum number of possible ptiles that are allowed to pass to the secondary tiling step=50, and the maximum number of stiles generated per each ptile passed=1080.

1. The top ptile's displacement relative to the bottom ptile, to form the secondary tile dxs,dys
2. The effective parallelogram area used per part—Pa
3. The ranked sequence from best to worst stile for both the ptile passed and the stile for that ptile(singly dimensioned to (50))—Nseqncs,TSeqncs
4. The total number of stiles generated by the secondary tiling step for each ptile passed to it (singly dimensioned to (50))—Ns /Layout/

/Layout/ contains variables for the storage of the following Layout characteristics.

1. The nest displacement for the best layout—dxlayn, dylayn
2. The ptile displacement for the best layout—dxlayp, dylayp
3. The stile displacement for the best layout—dxlays, dylays
4. The smallest effective parallelogram area used per part, in the final layout—Pamin Nesting Nesting is the process by which two irregular objects or parts are taken and brought together until they "touch" each other on their periphery. This grouping of two parts is called a "nest". A nest is typically formed from two different parts, but for the pictorial examples that follow, the same part is used. The parts are brought towards each other as close together as possible to form a nest as compact as possible.

Figure 5A:
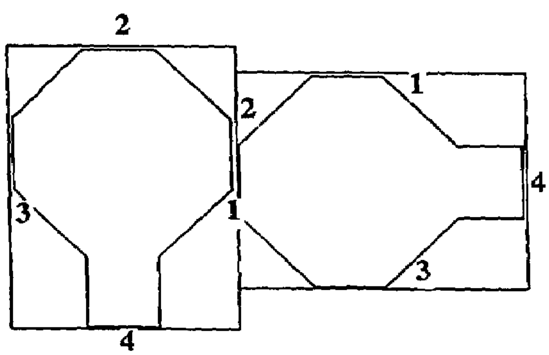
FIGS. 5A and 5B shows two nest approaches for a nest of the part of FIG. 2.
Figure 5B:
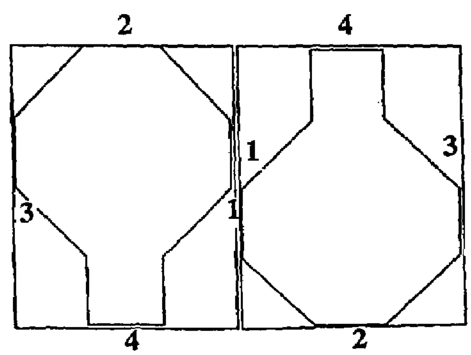

First, the parts to be nested are circumscribed inside the smallest possible rectangle. The four lateral faces of this rectangle are numbered from 1 to 4. A loop is set up to go through all possible combinations for each face of the left part to be approached by each face of the right part, a total of the combinations in all. FIGS. 5A and 5B illustrate two nest approaches where FIG. 5A shows nesting for sides 1 and 2 (left and right part respectively) and FIG. 5B shows sides 1 and 1.

Nesting is accomplished in two steps: the axial move (in the x direction or direction of approach), and the tangential move for further reduction of the overall area of the nest. The left part of the nest remains static whereas the right part is iteratively moved towards the left part in search for the maximum approach to it. Since the approach is in the x direction, a grid is first defined in the y direction which contains the starting locations for the right part's approach toward the left part. A total of ten grid locations is implemented in the y direction. Combining these y grid points with the number of face to face combinations, the maximum number of nests is generated by the program, which is 100.

The axial move is accomplished by calculating $N_v$ intersection distances from the left part's vertices towards the right part's sides, and $N_v$ intersection distances from the right part's vertices toward the left part's sides. The amount that the right part can now be moved towards the left one is the smallest of the 2-$N_v$ distances calculated for each of the 100 (maximum) nests to be computed.

The tangential move is an adjustment that is implemented once the axial move has been performed. For the tangential move, the part displaced with the intersecting vertex along the other part's intersecting side in the direction along this side until another collision occurs forming a more compact nest. In order to accomplish this move, the parts are rotated by an angle such that the intersecting side is horizontal, allowing use of the same intersection routine as for the axial move, saving a great deal of computation time.

Figure 6A:
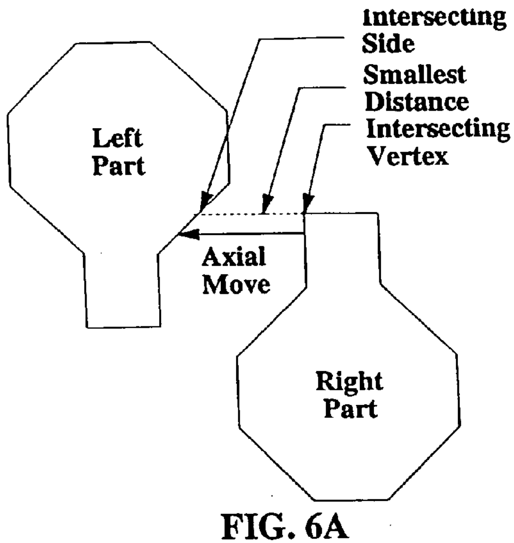
FIGS. 6A–6E show the nesting procedure for the exemplary part of FIG. 2.
Figure 6B:
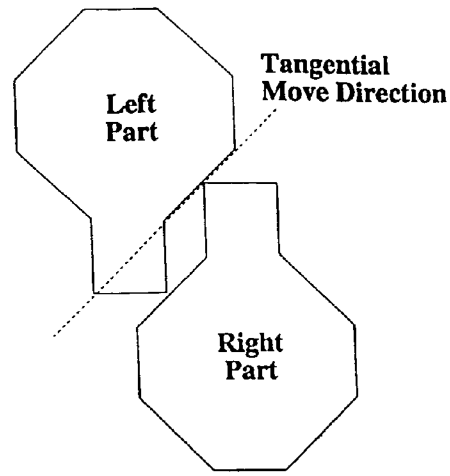
Figure 6C:
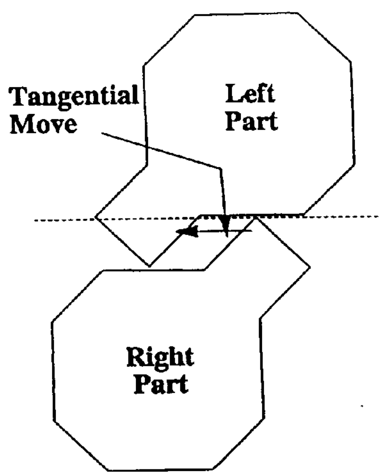
Figure 6D:
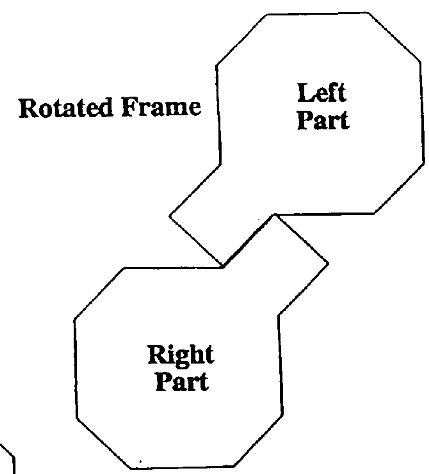
Figure 6E:
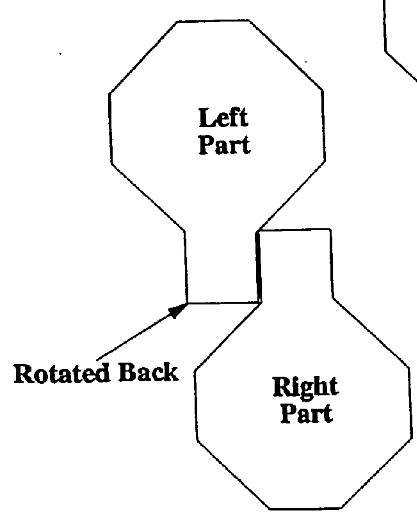

FIGS. 6A–6E show this nesting procedure for the exemplary part of FIG. 2. FIG. 6A shows the set up before the axial move. FIG. 6B shows the geometry after the axial move. FIG. 6C shows the situation after rotation is done so as to render the tangential direction horizontal. At this point, a similar intersection algorithm procedure to the axial move is performed in order to obtain the smallest intersecting line to further approach the right part towards the left one. FIG. 6D depicts the set up after the right part has been moved, and finally; FIG. 6E shows the final nested situation with the frame of reference rotated back to the original position.

Once the nests are formed, their total and partial area extents are calculated and stored appropriately. Then, these nests are sorted and sequenced, from best to worst, by seeking for the smallest area extents. Weight factors are applied to each of the two heuristic variables in order to investigate their individual effectiveness. This process is referred to as Nest Ranking.

Primary Tiling

Once the nests are formed and ranked, a predetermined number of these nests (the ones that ranked highest) are passed to the primary tiling step. In this step, two nests are brought together in the x direction to form a primary tile or "ptile". A ptile is made of two nests or four parts. The same rationale is used to form a ptile as to form a nest. The primary tiling procedure starts by placing two nests side by side in the x direction. As in the nesting step, the left nest remains static whereas the right nest is moved towards the left one as much as possible.

Figure 7:
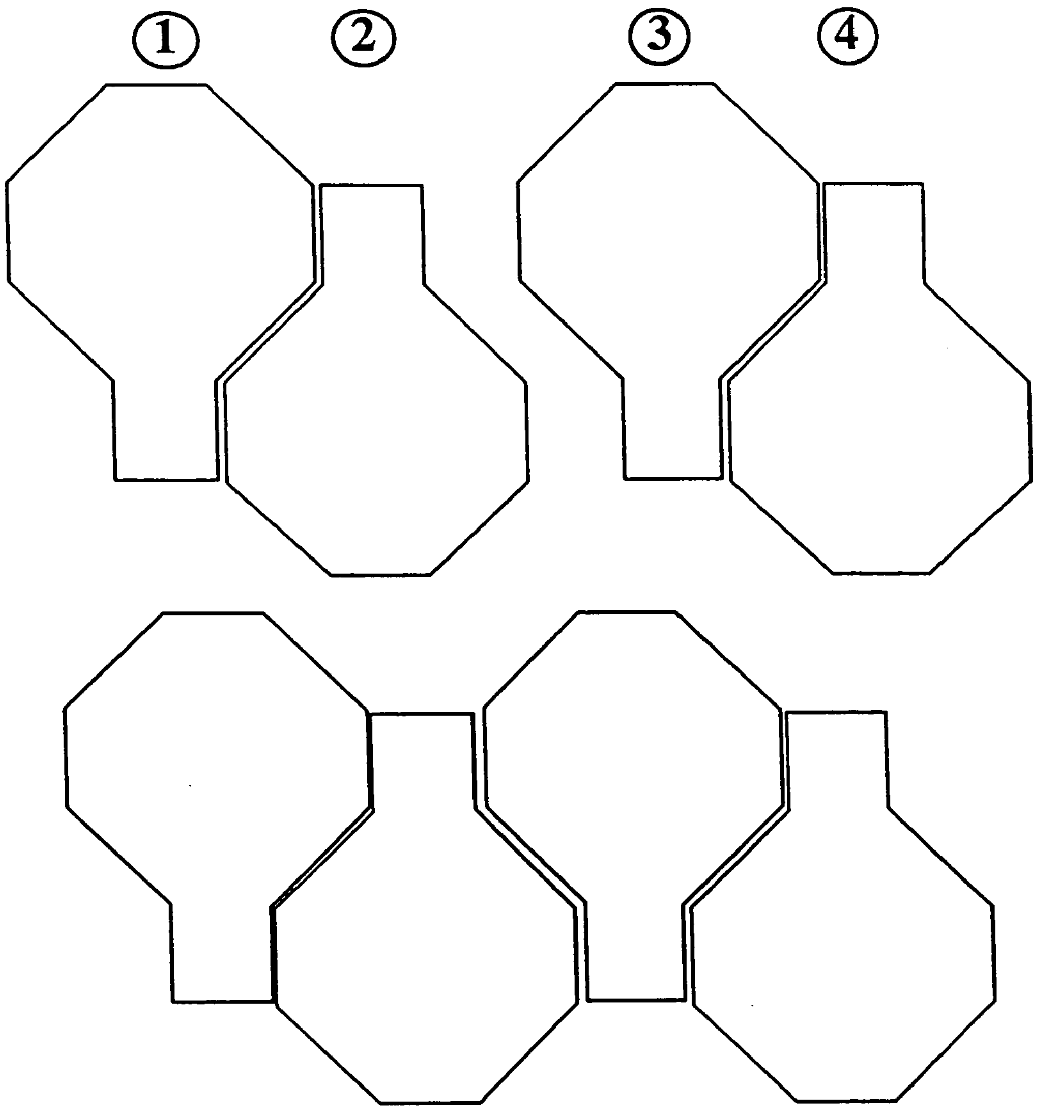
FIG. 7 shows a set up and actual tile for a primary tile for nests of the exemplary part of FIG. 2.

A ten point grid is formed in the y direction for the iterative. Since the maximum number of nests passed to the primary tiling step is 50, a maximum of 500 ptiles are generated. Once the two nests are set up and made ready for axial compression (in the x direction), the intersection algorithm is recalled in order to calculate the smallest distance to approach the right nest towards the left one until any part on the right nest touches any part on the left nest. The parts set up in this process is done in the following manner:

Part 1: Left Part—Left Nest
Part 2: Right Part—Left Nest
Part 3: Left Part—Right Nest
Part 4: Right Part—Right Nest The intersection algorithm routine is then performed four times in sequence to check for the smallest axial approach. The routine is called for parts 1 and 3, then for parts 1 and 4, then for parts 2 and 3, and finally for parts 2 and 4. This allows investigating of the collision of any of the parts on the left nest with any of the parts on the right nest. FIG. 7 shows first the set up situation for a particular primary tile of the exemplary part and then the actual tile achieved.

Secondary Tiling

Figure 8:
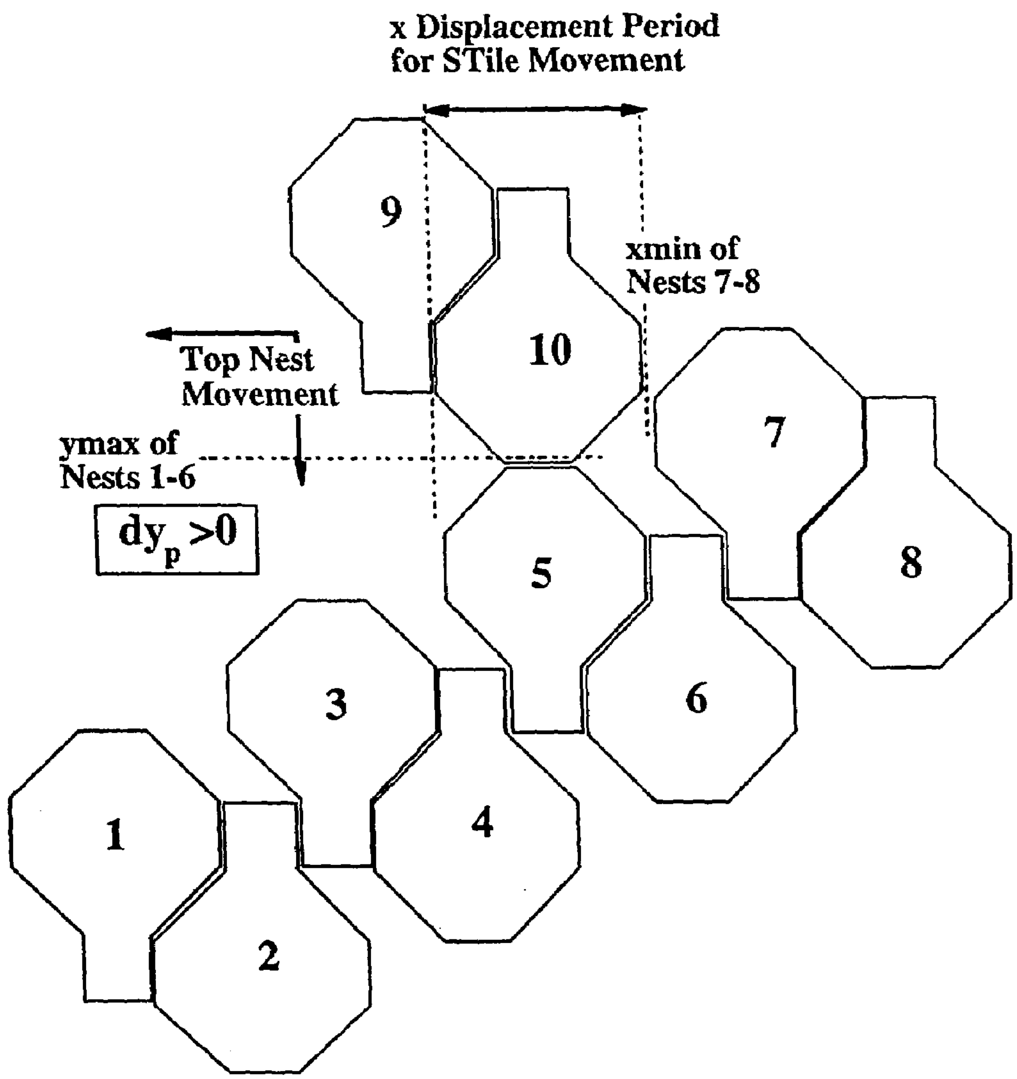
FIG. 8 illustrates the secondary tiling step of the invention.

A small percentage of the ptiles formed (a predetermined number) are then passed onto the secondary tiling step. In the secondary tiling step, as shown in FIG. 8, two ptiles are brought together in the y direction to form a secondary tile or "stile". An stile is made up of two ptiles or four nests or eight parts. In order to set up the geometry for secondary tiling, first two ptiles are placed on the bottom of the domain. Then one more nest is set up along the top that will be nested downwards towards the two ptiles near the bottom of the space. The two ptiles on the bottom are composed of parts numbered 1 through 8 from left to right. The two parts making up the nest at the top are labeled 9 and 10. The top nest (the one to be dynamically moved to form the stile) is positioned according to whether the ptile has downward or upward flow (dyp<0 or dyp>0).

FIG. 8 describes the geometry prior to the secondary tiling iteration for the case of dyp>0. In that Figure the top nest is positioned just above the bottom left three nests and to the left of the bottom rightmost nest. The top nest is then iterated on a x grid in a similar manner as the ptile process, except that the x displacement for this grid (as shown in the figure) is equal to the primary tile period. Again, the same rationale as before is used and in the process, ten different stiles are generated for each of the ptiles passed onto this step form the primary tiling step.

In order to do a y direction secondary tiling, the coordinate system is first rotated 90 degrees and the previously described axial (x direction) intersection algorithm is performed. In this case, the smallest approach distance between any of the two top parts (parts no. 9 and 10) and any of the six bottom parts is detected (parts no. 1 through 6 for the dyp>0 case). In the case of dyp<0, the top nest is set up just to the right of the bottom leftmost nest. As a result, the intersection test is made between parts 9 and 10 (top nest) and parts 3 through 8 (bottom tiles).

Layout

Once the secondary tiling is performed, two numbers are known: the primary and the secondary tiling period. These are the numbers that represent the displacements in the primary and secondary tiling directions, which enable replication of as many nests as desired on a skewed plane formation for these parts. Finally, a simple layout routine takes the data generated for the best secondary tile and computes the ideal parallelogram area needed to contain a single nest. This parallelogram area is calculated using the coordinates for the two displacements necessary to form a layout: the primary tiling period ($x_p$,$y_p$), and the secondary tiling period ($x_s$, $y_s$). The area of the parallelogram forms is then calculated from the following formulae:

$$l_p = \sqrt{x_p^2 + y_p^2}$$

$$l_s = \sqrt{x_s^2 + y_s^2}$$

$$\cos\theta_{ps} = \frac{x_p x_s + y_p y_s}{l_p l_s}$$

$$A = l_p l_s \sin\theta_{ps}$$

A computation of the utilization ratio follows by calculating the actual part area and dividing that by the needed parallelogram area. Then, the layout routine creates a file with the CAD commands that generate the best layout for the parts nested.

With the invention, very efficient layouts can be determined with reasonable computation times, using two heuristical variables to eliminate unnecessary branches in the computation process. For simple parts, around 20 nests and primary tiles can be used for passage to higher tiling stages, and still achieve near optimal packing efficiencies. Other numbers of nests and primary tiles can also be used.

Figure 9:
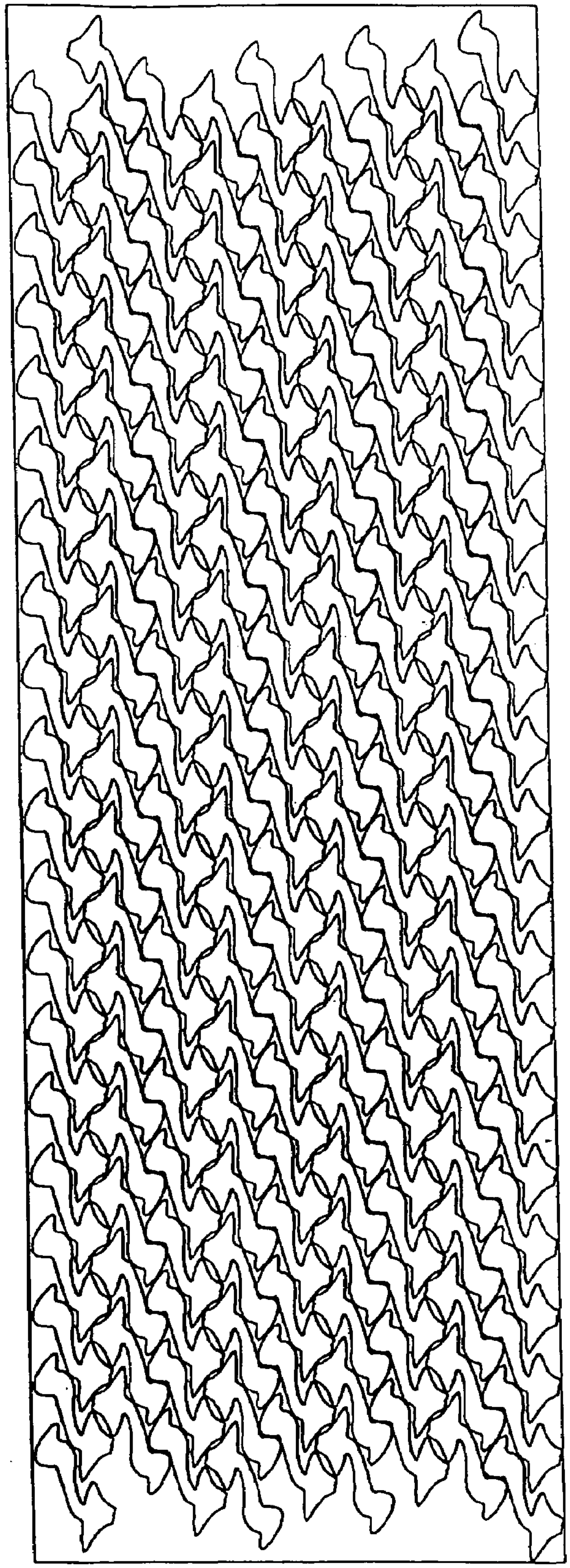
FIGS. 9 and 10 show exemplary nesting layouts determined using the method and system off the invention.
Figure 10:
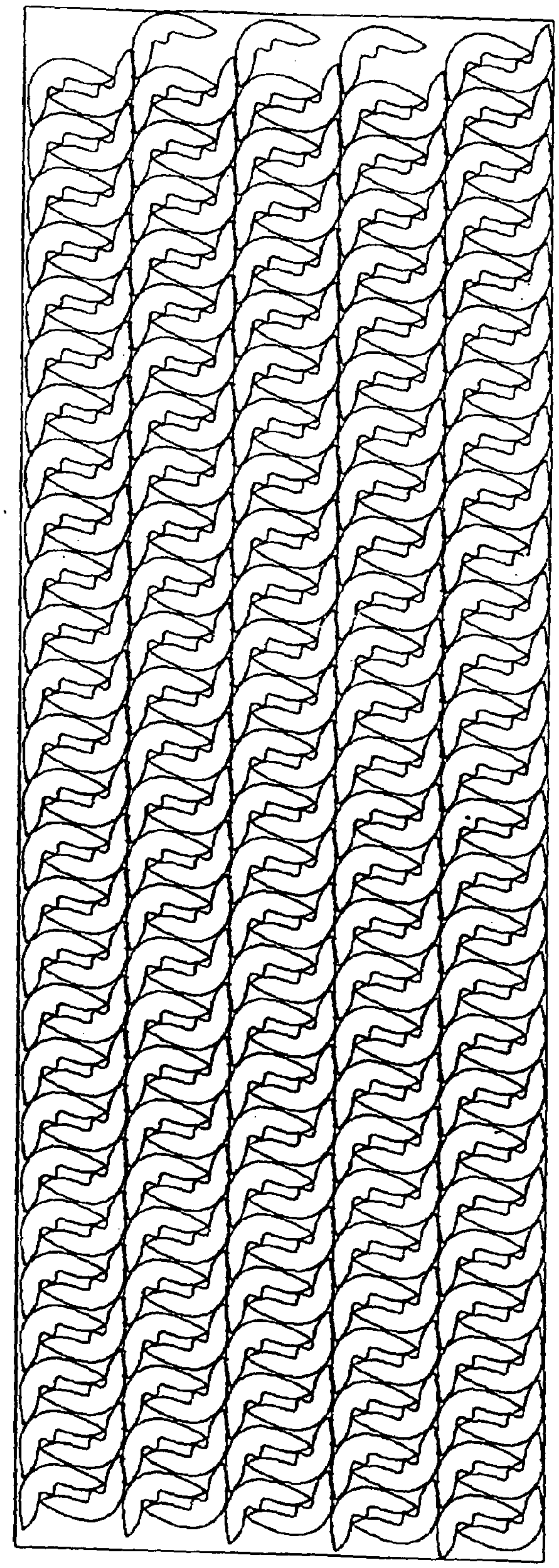

FIGS. 9 and 10 show exemplary nesting layouts for components of a shoe, which were determined using the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

II. Method and System for Nesting Three Dimensional Objects in a Target Volume

REFERENCE TO RELATED APPLICATION

This application is a non-provisional application based on provisional U.S. application Ser. No. 60/069,561, filed on Dec. 12, 1997. That application is incorporated by reference herein.

FIELD OF THE INVENTION

The present invention is in the field of manufacturing packaging and design and more particularly relates to methods and systems for nesting (or packaging) of three dimensional objects in a target volume. Nesting is the process of placing objects together with minimal space between them.

BACKGROUND OF THE INVENTION

There are many design and manufacturing processes in which substantially two dimensional parts-to-be-assembled are initially laid out on and then cut from planes or sheet stock. For example, leather shoes, clothing, pocketbooks, and automobile and furniture upholstery are often formed from a plurality of panels, or parts, cut from a cowhide. After cutting of the panels for such an article, conventional seam joining techniques, such as sewing, are used to assemble the panels to form the finished article. Clothing, upholstery and many other articles of other materials are similarly designed and manufactured in a similar manner. Such other articles include body parts for automobiles, for example, hoods or fenders, which may be stamped from metal sheets, and then subsequently shaped to form the final part configuration. Numerous other articles are similarly manufactured from planar sheets as well.

In the manufacture of all of these parts, it is important to minimize the waste which remains after the parts are cut from the sheet stock. While in some cases, where the waste can be re-used, such as in the case of sheet metal, this factor is of lesser importance, there are many cases where the minimization of waste is of critical importance to the commercial viability of a product. The latter cases particularly include shoe manufacture, where the cost of materials, for example cowhides or synthetic materials, is very high.

In view of such cost considerations, manufacturing processes generally include attempts to minimize waste. However, the conventional attempts at such minimization have been relatively ineffective. In the leather shoe industry, for example, parts are often manually die cut from cowhides, where the die is manually placed on the hide by skilled (or relatively unskilled) workers, typically resulting in maximum yields in the 50–60% range for the typical irregularly shaped parts. In recent years, computer controlled layout of parts on a hide have been achieved, resulting in typical yields as high as the 60–70% range.

In U.S. Pat. No. 4,210,041, the present inventors disclosed a method for laying out, or nesting, a plurality of identical irregular non-polygonal rounded pieces on a parallel edge-bounded sheet material with relatively little waste. In accordance with the method of that patent, the salient points of the part boundary are connected by straight lines to box the part boundary in a plane polygonal figure. Then, pairs of such plane polygonal figures are pairwise positioned to within a plane closed parallelogram. Finally, a plurality of such parallelogram are arranged side-by-side to define a multiple repeat pattern of objects equal in width to the planar sheet from which the parts are to be cut. A nest constructed in accordance with U.S. Pat. No. 4,210,041 does offer improvement in nesting over prior art techniques; however, the resulting nests are still less than optimal.

Part I of the disclosure as set forth above discloses improvements in nesting of two dimensional objects. That application is incorporated by reference herein.

Further, there is a need to nest three dimensional objects in a target volume.

Typically three dimensional objects are manually, or by machine, packed in target volumes with less than optimal techniques. It would be advantageous in many industries to use an optimal technique. For example in the container shipping industry, containers are packed with objects to be shipped using manually determined placement of the object, generally starting from one border of the container and adding objects one at a time until the container is "full". There are of course cases where an optimized process is easily realized, such as where identical cubic objects are placed in a container having dimensions which are integer multiples of the dimensions of each side of the cubic object. Generally, however, the cubic shape and those container dimension constraints are not present and the conventional packaging methods result in a "filled" container with substantial void regions between the packed objects.

It is an object of the present invention to provide an improved method and system for defining a nest of three dimensional objects.

It is another object to provide an improved method and apparatus for packaging a plurality of three dimensional parts in a target volume.

SUMMARY OF THE INVENTION

The invention is a method and system for defining placement of a plurality of three-dimensional (3D) objects in a target volume with minimal void space between them. The invention automatically packs the maximum number of irregular parts possible (preferably, of up to two different shapes) with minimum wasted interpart void regions. The invention uses a heuristic approach, so that intelligent decisions are made in order to carry only a small percentage of intermediate solutions to completion. In typical cases, this enables the computation time used in the nesting process to be reduced from hours to minutes, allowing for a more interactive nesting design environment.

The invention uses a combination of topology analysis and numerical iteration to determine an efficient layout in short computation times. The process commences by defining a first sub-nest in a central part of the target volume, grouping parts to each other, and then "grows" or extends outward toward the boundaries of the target volume. The resultant packing layouts are generally parallelogramic, angled in nature. The "angled" layout is contrary to conventional rectangular (90 degree) nesting practice. A heuristic approach is used with an iteractive process to curtail long computation times and to produce nested packing layouts much faster.

The nesting method and system of the invention maximizes target volume utilization from the "center outwards" by minimizing the void regions between nested parts. In contrast, conventional nesting practice first defines a target area, and then fits parts starting from one boundary of the target volume and "flows" parts across the target volume until the opposite edge is reached.

The heuristics used to curtail long computation times, are intermediate measures of how good a nest is. As the process proceeds from one stage to the next, measures of nesting effectiveness are calculated and only a small percentage of all the possibilities are allowed to continue to higher stages. This "nest culling" heuristical process is effective in substantially reducing computation times. By allowing only the best intermediate nests to proceed to primary, secondary and tertiary "tiling" stages, layout times are typically reduced with no practical loss in nesting efficiency.

BRIEF DESCRIPTION OF THE DRAWINGS

Figure 11:
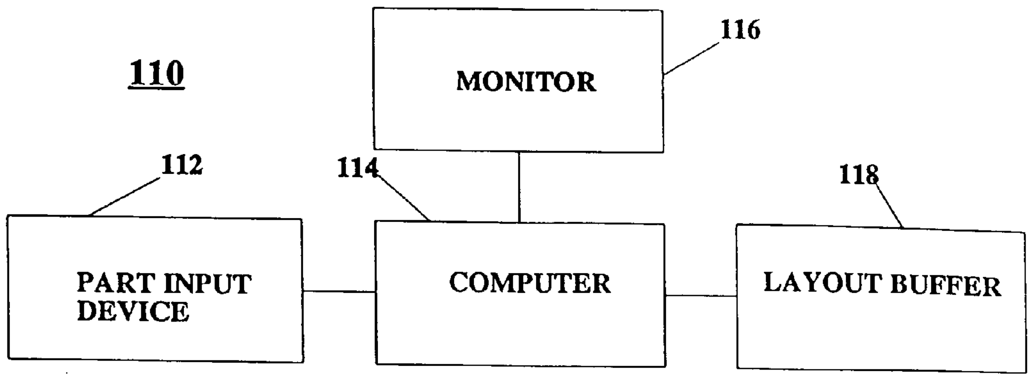
Figure 12A:
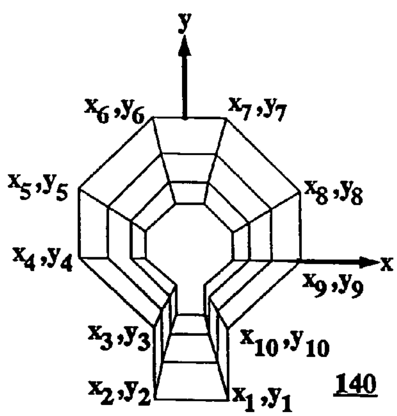
Figure 12B:
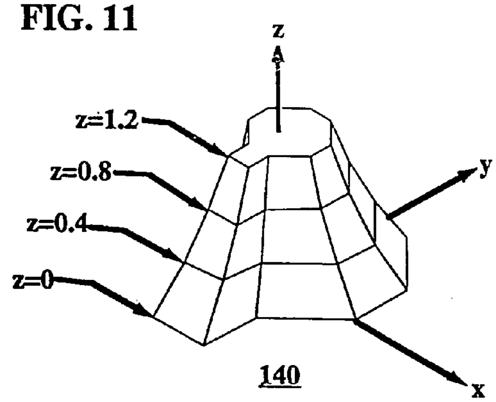
Figure 13:
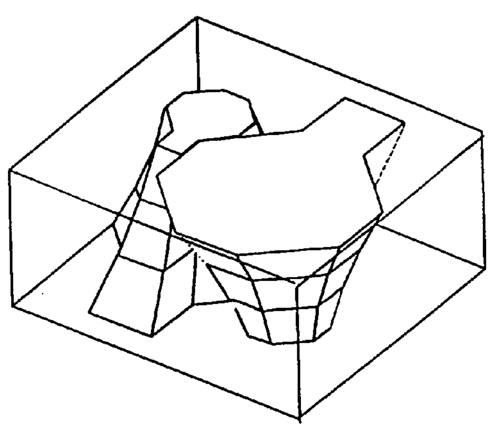
Figure 14:
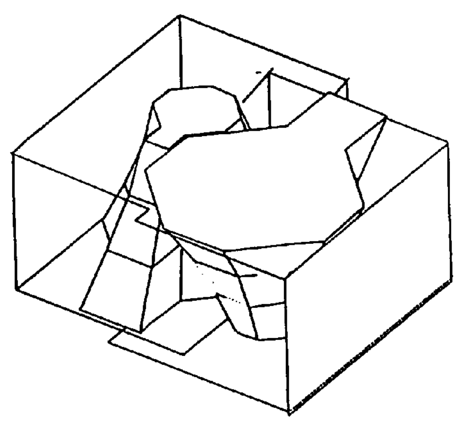
Figure 15A:
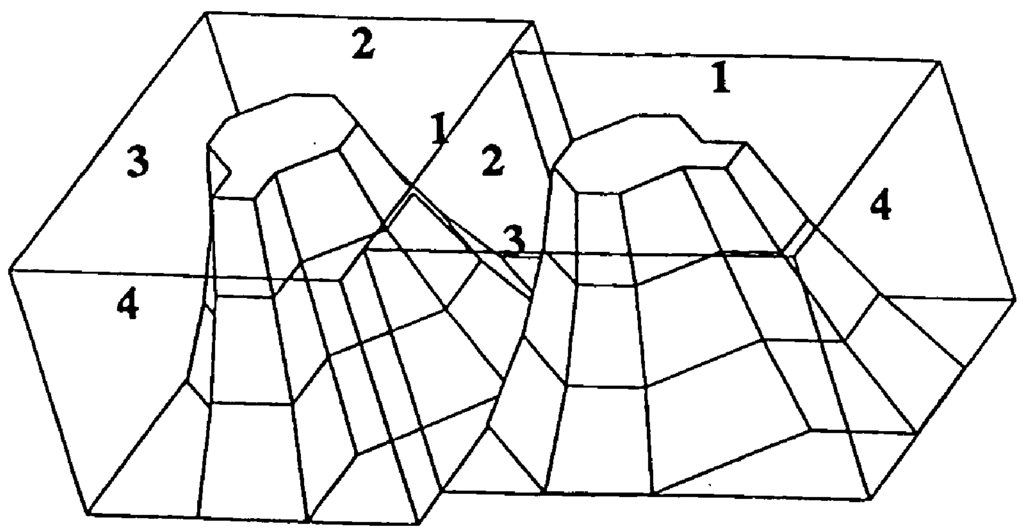
Figure 17A:
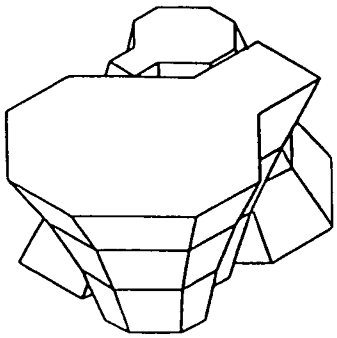
Figure 17B:
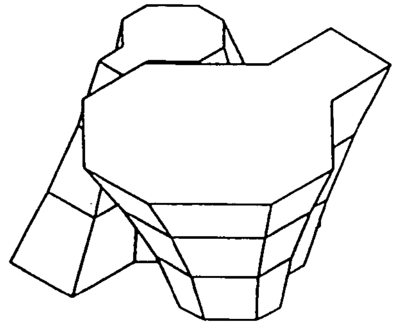
Figure 18A:
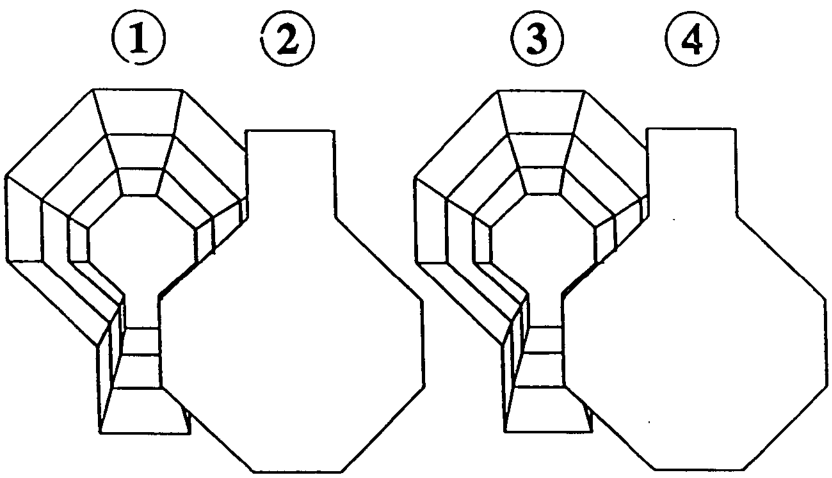
Figure 18B:
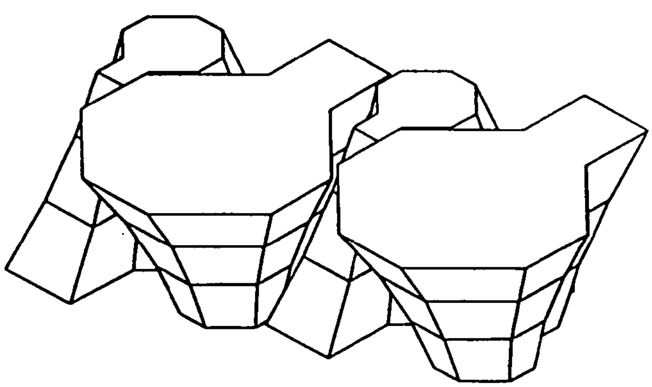
Figure 19:
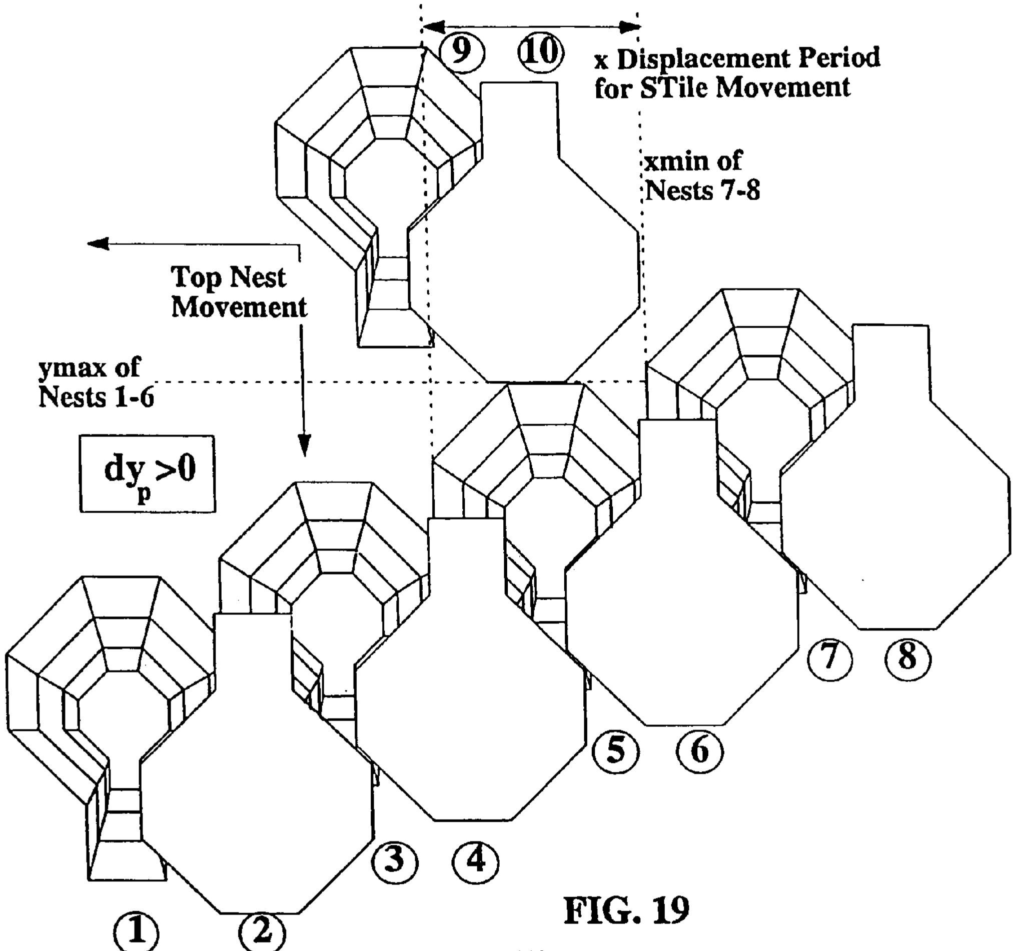
Figure 20:
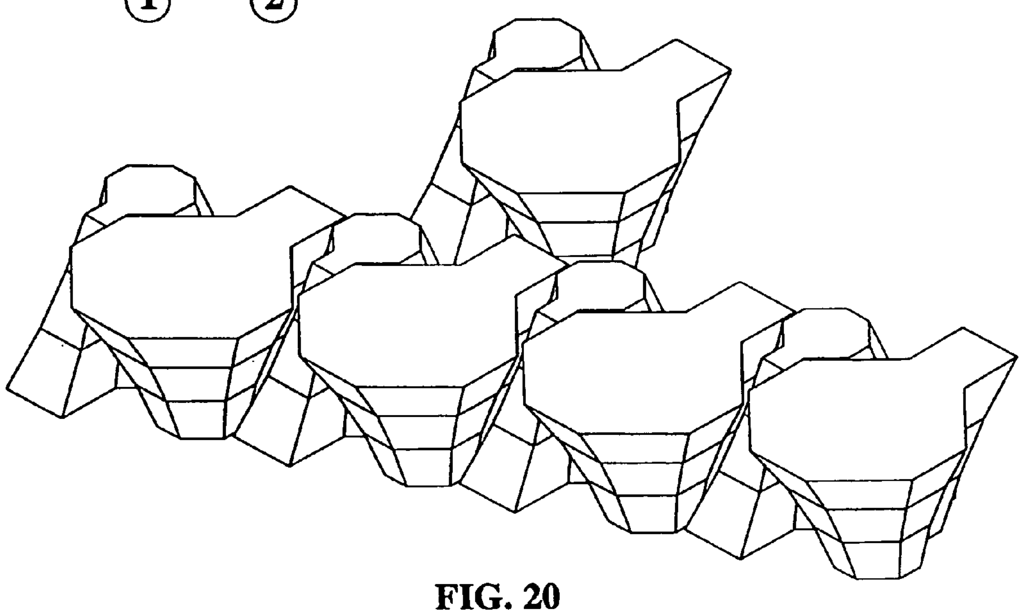
Figure 21:
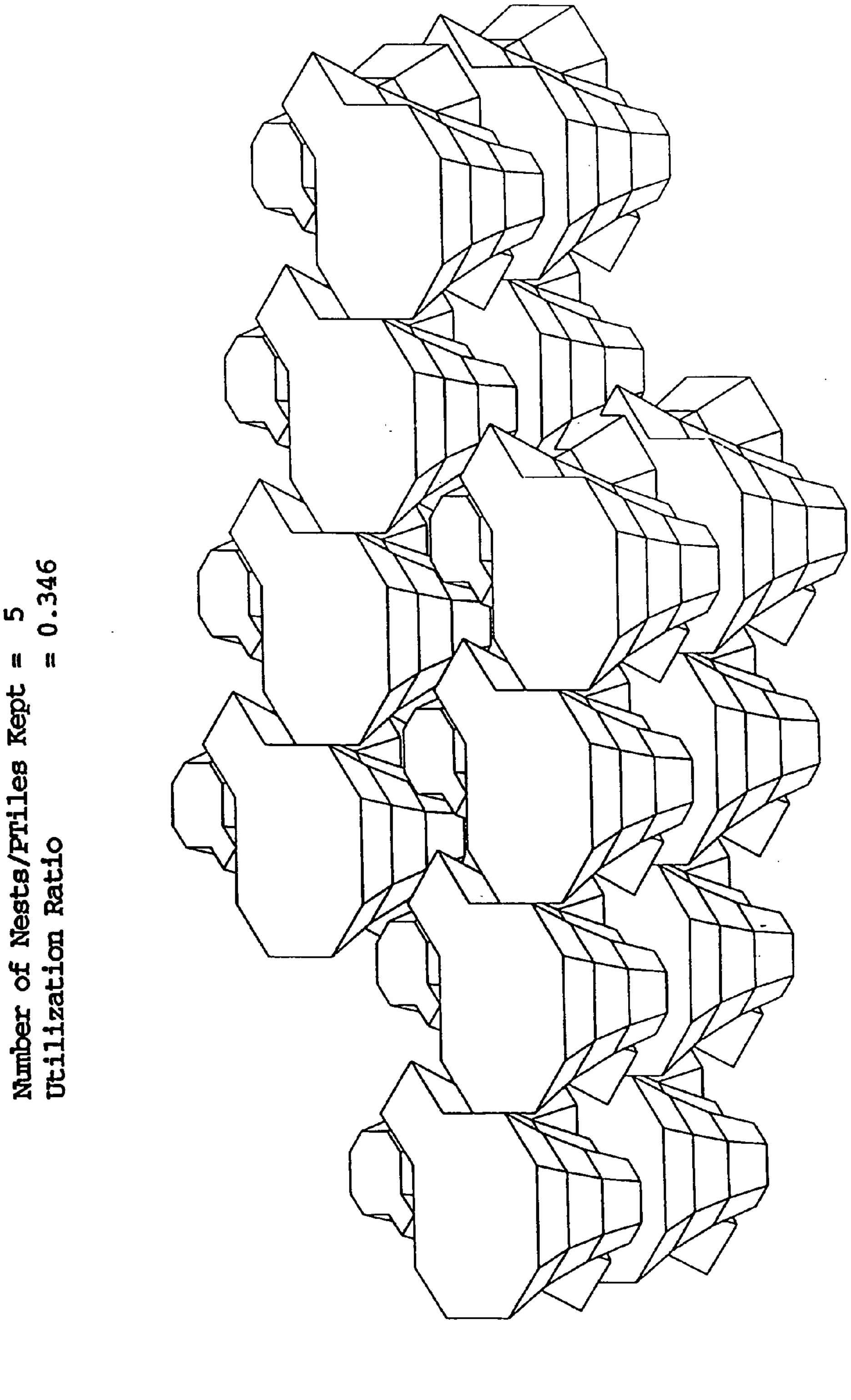
Figure 22:
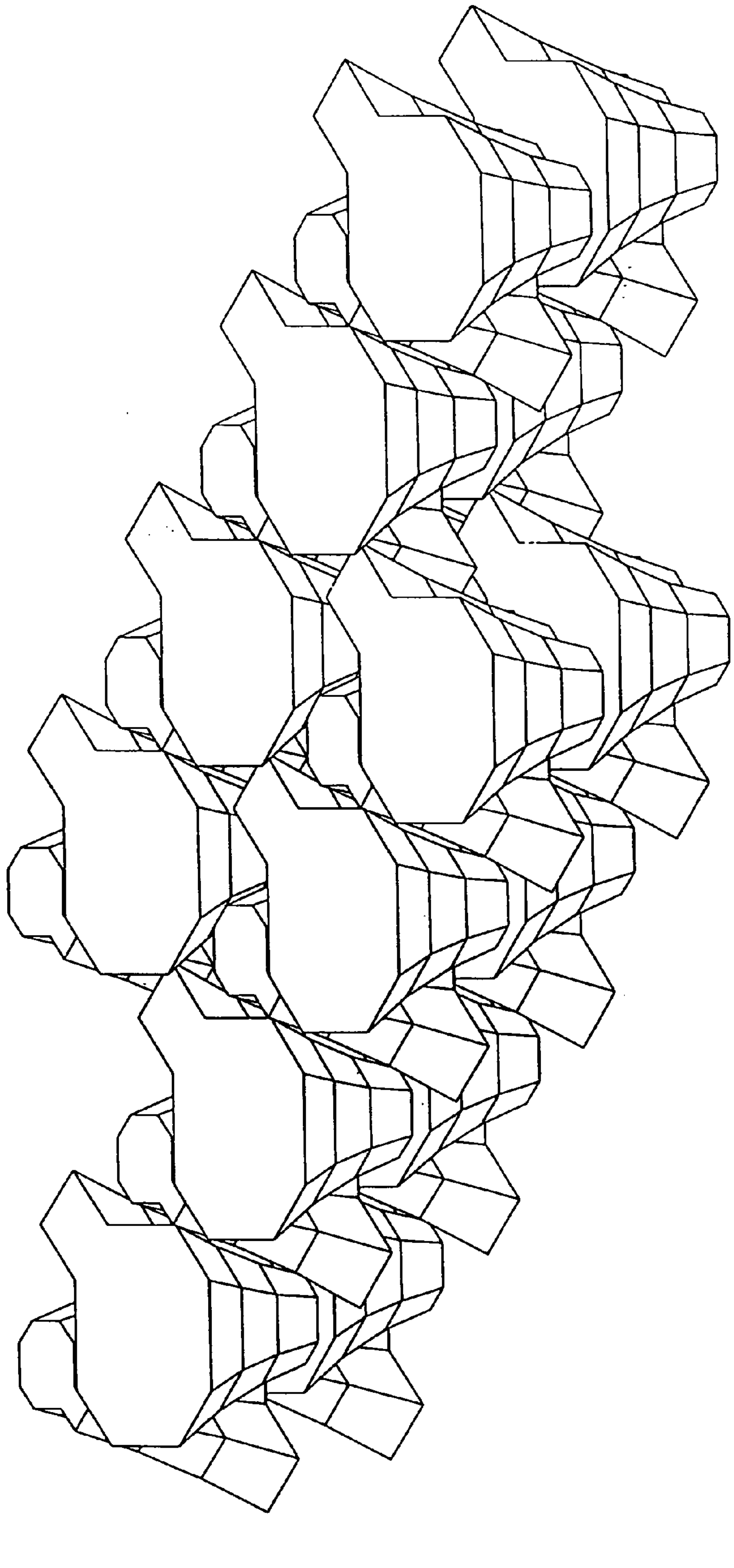
Figure 23:
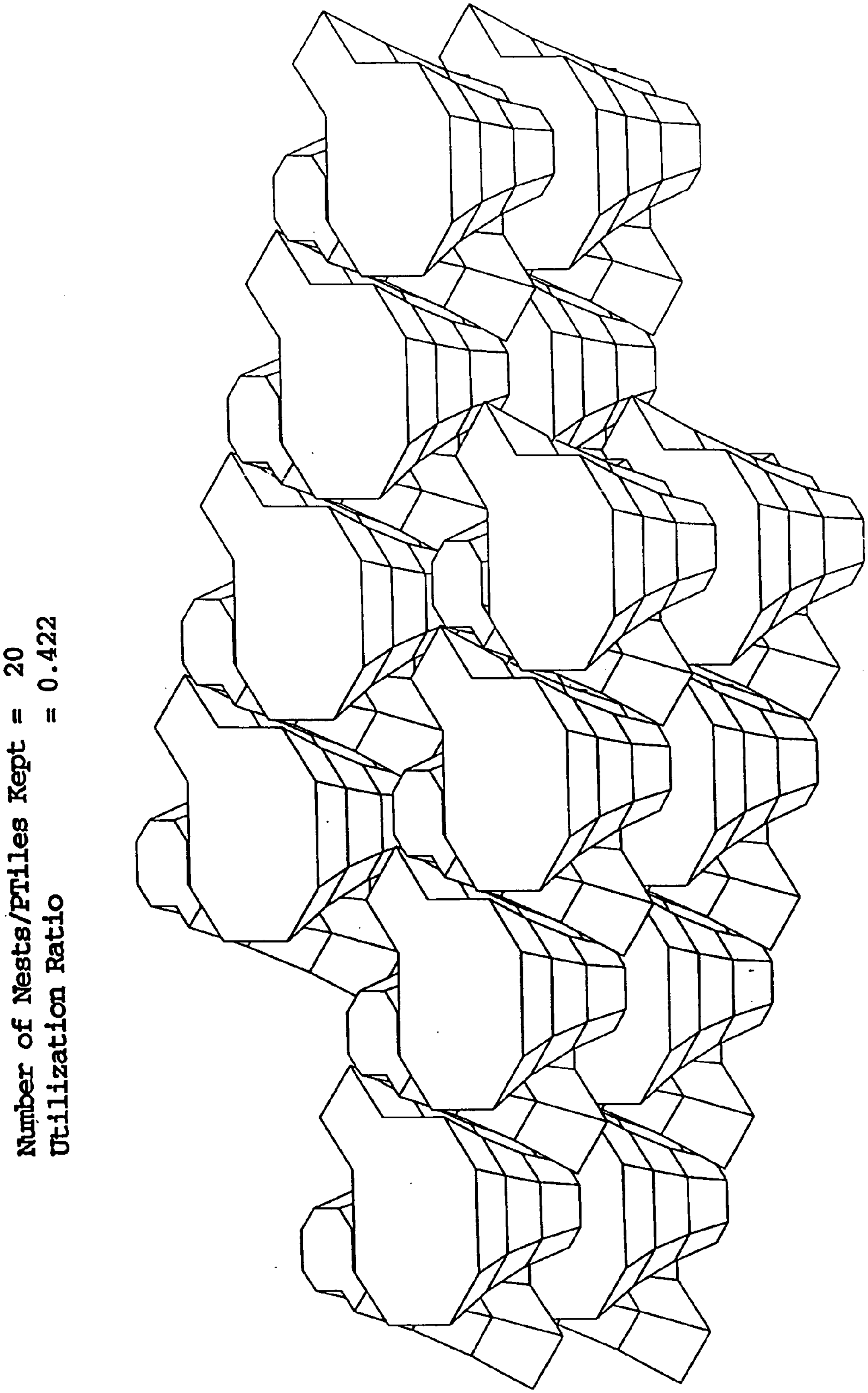

The foregoing and other object of this invention, the various features thereof, as well as the invention itself, may be more fully understood from the following description, when read together with the accompanying drawings in which:

FIG. 11 shows a block diagram of a system in accordance with the invention;

FIGS. 12A and 12B show an exemplary part to be nested;

FIG. 13 shows the total nest extent for a nest of the part of FIG. 12;

FIG. 14 shows the partial nest extent for a nest of the part of FIG. 12;

FIGS. 15A and 5B shows two nest approaches for a nest of the part of FIG. 12;

FIGS. 16A–16E show the nesting procedure for the part of FIG. 12;

FIGS. 17A and 17B show two "better" nests of the part of FIG. 12;

FIGS. 18A and 18B show a set up and actual tile respectively for a primary tile for nests of the part of FIG. 12;

FIG. 19 shows the geometry prior to secondary tiling for the part of FIG. 12;

FIG. 20 illustrates the secondary tiling step for the part of FIG. 12; and FIGS. 21, 22 and 23 show final 3D layouts for the part of FIG. 12.

DESCRIPTION OF THE PREFERRED EMBODIMENT

The invention is a method and system of nesting a plurality of irregular three dimensional parts into a target volume. The method (and system) uses a combination of topology analysis and numerical iteration to find an efficient layout in short computation times. It starts from an interior (and preferable "center") of the target volume, grouping parts to each other and then "grows" or extends outwards toward the boundaries of the target volume. The resultant packaging layouts are parallelepiped like in nature. This "angled" layout approach is opposite to conventional rectangular (90 degree) nesting practice. A heuristic approach is used in order to curtail long computation times and to rapidly produce nested layouts, giving a designer a much greater interactive responses in his task.

The method and system of the invention maximizes volume utilization from the "center outwards" by minimizing the voids between nested parts.

The heuristics used in order to curtail long computation times, are intermediate measures of how good a nest is. As the computation proceeds from one stage to the next, these measures of nesting effectiveness are calculated and only a small percentage of all the possibilities are allowed to continue to higher stages. This "nest culling" heuristical process substantially reduces computation times. By allowing only the best intermediate nests to proceed to tiling stages, layout times are reduced typically from hours of computation to minutes, with no practical loss in nesting efficiency.

A system 110 embodying the invention is shown in FIG. 11. The system 110 includes a part input device 112 a programmed digital computer 114 with an associated display 116 and an output layout buffer 118. The part input device 112 may be a conventional computer running a computer aided design program, such as AutoCad. The computer may be an IBM type Pentium-based or an Apple PowerPC-based personal computer (with a conventional monitor for display 116) programmed to perform the process of the invention. The layout buffer 118 may include a conventional storage medium for storing the layouts determined by the programmed digital computer 112.

The computer program for computer 110 nests many irregular 3D shapes into a regularly shaped "box". In defining that program, there are four tasks which are listed below:

Objective I: Three dimensional extension of the nesting algorithms of Part I of this disclosure as set forth above.

- Task 1: Define and implement input of the geometry of parts (components) and targets boxes in three dimensions.
- Task 2: Extend our main intersection algorithm to three dimensional domain.
- Task 3: Add three dimensional numerical iteration loops for the part's depth.
- Task 4: Change measurement of nesting success to void volumes and nest extent volume as opposed to areas."

An automatic three dimensional packaging method and system computes the geometric layout of the various components within the target "box" in an efficient and relatively fast turnaround time. The method and system accomplishes three dimensional nesting in reasonable times and obtains high levels of packing densities.

Task 1:

In Task 1, parts or components to be packed and target boxes are defined and input in three dimensional space. Initially, a two dimensional peripheral polygon for the cross-section of the three dimensional object is defined and stored in terms of a list of x, y coordinates for the vertices of the boundary of the part's cross-section. The part's cross-sections are defined as multisided polygons. These polygons can typically have 10's or 100's of sides depending on the complexity of the figure (curvature of its sides) and the required accuracy of the nesting solution. An extrusion coordinate for every x, y coordinate of this cross-section z (x, y) defines a large class of solid components, those which have box like appearance.

Nevertheless, not all components may be modeled in this fashion. For example, spheres can not be modeled with this simple extrusion method.

Consequently, in those cases a more general method is used that handles all component shapes. In this case, a polygon is first defined for the maximum cross-section.

Then this cross-section polygon is subdivided into an (x, y) grid space of approximately ten subdivisions for each (depending on accuracy desired). Finally, left and right extrusion values are defined for each grid node. This more complicated description of the component is particularly useful for complex parts.

A "Multiple Extrusion" solid molding technique is used. This technique defines a series of cross-sectional polygons in the xy plane (typically 5 to 20 cross-sections), which are then multiply extruded/connected in the z direction. Each cross-sectional polygon can be made of (typically) 10 to 100 vertices described by x, y coordinate pairs. In addition each cross-section is associated with a given z coordinate level or value. After connecting corresponding vertices across "z cross-section levels" a three-dimensional body fitted mesh is formed for the peripheral surface of the parts. This method for part input enables a description of a wide variety of 3D solids.

Task 2:

In Task 2, the intersection algorithm of the above described two dimensional form of the invention is extended into three dimensions.

In the three dimensional case of the invention, coordinates of the form (x, y, z) are used so that a check for minimum translational intersection distance is:

$$\sqrt{(x_2^2-x_1^2)+(y_2^2-y_1^2)+(z_2^2-z_1^2)}$$

This check may be done between every "peripheral node" of component 1 with every "peripheral node" of part 2. Once that distance is obtained, it is subtracted from every node on one of the parts into what constitutes the translation of that part toward the other one until they effectively touch each other. The procedure calculates the intersection of part 1 vertices with part 2 sides and part 2 vertices with part 1 side, for each of overlapping cross-section planes in the z direction. The computation of vertex to side distances is described more fully below in connection with the nesting section of the program description.

Task 3:

The invention uses not only "primary" and "secondary" moves in the nesting and tiling steps, but also a "tertiary" move in the component depth direction. A third nested loop is used for numerical iteration in order to apply the three dimensional intersection algorithm in the "z" direction. This third loop is used at every step of the calculational procedure Nesting, Primary Tiling and Secondary Tiling. In addition a tertiary tiling step is used in order to place nests and ptiles into the z direction. This step is described more fully below in connection with the computer program description.

Task 4:

Geometrical computations are used to determine the size of the nest volume "Total Volume Extent". Obtaining the volume of an assembly of components is a straight forward calculation. The volumetric extent of the void spaces between the components may be computed. However, in the preferred form, Instead of computing nest's void volumes, the "Partial Volume Extent" of a nest is calculated. As described in more detail, in the nesting section of the computer program description, this partial extent includes a measure of the volume intersected between parts when forming a nest. This volume saved is the inverse or complement of the void volume used as a heuristic. This "intersection" saved volume is much easier to calculate, and has similar bearing in terms of the effectiveness of a nest as the wasted void volume.

Heuristic algorithms are used for nest culling, total volume extent and partial volume extent. These heuristics limit the number of nests passed to the primary tiling stage and the passage of the primary tiling to second tiling stage. This further limits the search tree and has dramatically improved the performance of the expensive (computer timewise) tiling stage. Many different values for the number of nesting and tiling steps kept and weighting factors may be used for the main heuristic variables. The weighting factors for both the heuristical variables (total and partial volume extents) are constant and set to 1.0, as an example. Other numbers might be used.

Computer Program Description

This section provides a brief description of the computer program used in computer 1114. The hardware platform is an Apple Macintosh computer with a 17" color monitor and laser printer. The CAD software used for this embodiment consists of two packages—Autodesk's AutoCAD and Graphsoft's MiniCAD.

This embodiment was developed using the following combination of software tools: 1—Macintosh Programmer's Workshop (MPW) for the operating environment (including editing and debugging); 2—FORTRAN Compiler for the compilation of the program; and 3—MiniCAD for the three-dimensional part input and output layout visualization. The CAD package permits description of the 3D parts using the "Multiple Extrusion" method and interactive visualization of the 3D layouts. AutoCAD's AME solid modeling could alternatively be used to provide a more complete 3D solids description but with a more complex numerical description.

The inner regions of the nest have great importance in the invention (as opposed to the peripheral or edge regions near the target's boundaries). The computation is segmented into four sequential steps: Nesting, Primary Tiling, Secondary Tiling, and Tertiary Tiling/Layout. The process is initiated with the nesting step, two irregular 3D objects or parts are taken and "brought together" until they "touch" each other on their periphery. This grouping of two parts is called a "nest". These two parts are brought towards each other, as close together as possible to form as compact a nest as possible. Depending on the complexity of the parts being nested, the computer program performs from many hundreds to many thousand different nests and ranks them according to the compactness (using heuristic variables as previously described).

Once the nests are formed and ranked, a predetermined number of those nests (the ones that ranked highest) are passed to the primary tiling step. In this step, two nests are brought together in the x direction to form a primary tile or "ptile". A ptile is made of two nests or four parts. The same rational is used to form a ptile as to form a nest. That is, a grouping of two nests is created that forms the most possible compact unit. Typically, a few hundred ptiles are generated per each nest passed from the nesting step. These ptiles are consequently ranked using heuristic variables for compactness.

As small percentage of the ptiles formed (a predetermined number) are then passed onto the secondary tiling step. In this case, two ptiles are brought together in the y direction to form a secondary tile or "stile". A stile is made up of two ptiles or four nests or eight parts. Again, the same rational as used for nest formation is used, an in the process, over a thousand different stiles are generated for each of the ptiles passed onto this step from the primary tiling step. For each of these secondary tiles produced, a tertiary tiling is implemented. In the tertiary tiling secondary tiles are brought together in the z direction, using a simple stacking rational. The stiles are brought only as close as their closest boundaries, without optimization; that step is performed for every stile generated without secondary tile culling. In other embodiments, stiles are nested with appropriate culling to reduce computational time.

Finally, a layout routine takes the data generated for the best tertiary tile and computes the ideal parallelpiped volume needed to contain a single nest. A computation of the utilization ratio follows by calculating the actual part volume and dividing that by the needed parallelepiped volume. Then the layout routine creates a file with the 3D CAD commands that generate the best layout for the parts nested.

That layout may be displayed on monitor 116, or stored and/or printed in layout buffer/printer 118.

The following provides a step by step description of the computer program, starting with the method for describing 3D parts and ending with a description of the computation steps: Nesting, Tiling and Layout.

Three Dimensional Part Description

In order to describe and input parts in three dimensions, the program uses a "Solid Modeling" technique called "Multiple Extrusion". Using this technique, a series of cross-sectional polygons are defined in the xy plane (typically 5 to 20 cross-sections), which are then multiply extruded/connected in the z direction. Each cross-sectional polygon can be made of (typically) 10 to 100 vertices described by x, y coordinate pairs. In addition, each cross-section is associated with a given z coordinate level, or value. After connecting corresponding vertices across "z cross-section levels", a three-dimensional body fitted mesh is formed for the peripheral surface of the parts. This method for part input enables description of a wide variety of 3D solids including irregular boxes and spherical objects.

As an example of this methodology, FIGS. 12A and 12B shows a 3D object 140 created with four cross-sectional z levels labeled z=0, 0.4, 0.8 and 1.2. These are the values of the z coordinate at each cross-sectional level. Each cross-section in turn lies on the xy plane and is composed of ten vertices labeled with coordinates ($x_1$, $x_2$) through ($x_{10}$, $y_{10}$). This 3D figure is thus fully described with four sets of ten x, y coordinate pairs for a total of eighty numbers. This particular figure of FIGS. 12A and 12B is used in the following illustration of the invention.

The data defining the object 140 is stored in a text file, with all the x, y coordinate pairs. Thus, the invention enables a relatively straight forward design and input of a large variety of 3D parts using this multiple extrusion model.

Part Volume Calculation

Three different volumes are calculated: 1—the actual part volume, 2—the total volume extent for nests and tiles, and 3—the partial volume extent for nests and tiles. The computation of the part volume is relatively straightforward: the quadrilateral faces formed by the four vertices across two z levels are defined to be straight two-dimensional planes. If dz the z coordinate interval between cross-sections is referred to as dz and $y_{min}$ is defined as the smallest y coordinate at each cross-section, then the cross-section areas $A_k$ and part volume V are:

$$A_k = \sum_{i=0}^{N_v} \frac{1}{2}(X_{i+1} - X_i)(Y_{i+1} + Y - 2Y_{\min})$$

$$V = \sum_{k=1}^{N_z} \frac{1}{2}(A_{k+1} + A_k)dz$$

where $N_v$ and $N_z$ are the number of vertices per each cross-section, and the total number of cross-sections, respectively (10 and 4 in the case of object 140).

The total extent volume is the smallest box that can contain a particular nest or tile. This is illustrated on in FIG. 15. This total volume extent is calculated from the knowledge of the maximum and minimum x, y, z values for the parts within the nest or tile. The partial volume extent is illustrated in FIG. 16. That value is an accurate measure of the actual volume used by the individual parts within the nest or tile.

The partial extent is calculated by first computing the volumes of the smallest boxes encompassing individual parts and subtracting the "intersecting" volume between the parts being grouped into the nest or tile. It is a smaller volume than the "total extent" and it points more directly to a measure of part grouping compactness.

The total volume extend and partial extent described above are used throughout the various steps in the computer program as the two heuristic variables to determine the effectiveness of a particular nest or primary tile. Weighting factors are assigned as inputs to the computer program for these two extents so as to prefer one more to the other in the calculation. Both weights are set to 1.0 in the illustrated embodiment, but other values for these heuristic may be used for different nest and primary tile culling.

The algorithms for calculation for a nest made up of left and right parts (subscripts "l" and "r") are shown below. In this example, $ymin_1$ corresponds to the minimum y coordinate for the left part. The total extent (totExt) and partial extent (Part Ext) are determined in accordance with:

$$TotExt=[max(xmax_l, xmax_r)-min(xmin_1, xmin_r)]*[max(ymax_l, ymax_r)-min(ymin_l, ymin_r)]*[max(zmax_l, zmax_r)-min(zmin_l, zmax_r)]$$

$$Ext_l=(xmax_l-xmin_l)*(ymax_l-ymin_l)*(zmax_l-zmin_l)$$

$$Ext_r=(xmax_r-xmin_r)*(ymax_r-ymin_r)*(zmax_r-zmin_r)$$

$$Part\ Ext=Ext_l+Ext_r-[xmax_l-xmin_r]*[min(ymax_l, ymax_r)-max(ymin_l, ymin_r)]*[min(zmax_l, zmax_r)-max(zmin_l, zmin_r)]$$

Basic Structures

The computer program contains five storage structures where all the data for the various characteristics of the parts, nests, tiles and layouts are accumulated. Those structures are the /Part/, /Nest/, /Ptile/, /Stile/ and /Layout/ structures (denoted symbolically surrounded by slashes "/"). These variables are more thoroughly described below. The variables within each structure are:

/Part/

/Part/ contains variables for the storage of the following part characteristics:

1. Part name which correspond to the text file which stores the part's vertex data
2. Number of vertices per cross-section layer: $N_v$
3. Number of cross-section layers: $N_z$
4. The x, y coordinates for the minimum and maximum values: $x_{min}$ . . . $y_{max}$
5. The z coordinates for the lowest and highest cross-section layer—$z_{min}$, $z_{max}$
6. The z layer interval: dz
7. The X, Y arrays for the x, y coordinates of dimension ($N_v$, $N_z$
7. The X, Y arrays for the x, y coordinates of dimension ($N_v$, $N_z$)

8. The Z array for the z coordinates of dimension ($N_z$)

/Nest/

/Nest/ contains variables for the storage of the following nest characteristics, each of which is dimensioned to (7400) for the maximum number of possible nests that could be generated:

1. Left, Right part's side number—nsidel, nsider (an integer between 1–4)
2. A switch variable indicating whether the right part has been flipped in the z axis
3. The right part's displacement relative to the left part to form the nest: $dx_n$, $dy_n$, $dz_n$
4. The total and partial extent for the nest: $TotExt_n$, Part $Ext_n$
5. The ranked sequence from best to worst nest: $Seqnc_n$
6. The total number of nests generated by the nesting step (not an array)—$N_n$ /PTile/

/PTile/ It contains variables for the storage of the following Primary tile characteristics, each of which is dimensioned to (50,710) for the maximum number of possible nests that are allowed to pass to the primary tiling step=50, and the maximum number of ptiles generated per each nest passed=710.

1. The right nest's displacement relative to the left nest, to form the primary tile—$dx_p$, $dy_p$, $dz_p$
2. The total and partial extent for the ptile: $TotExt_p$, Part $Ext_p$
3. The ranked sequence from best to worst ptile for both the nest passed and the ptile for that nest (singly dimensioned to (50)): $NSeqnc_p$, $Tseqnc_p$
4. The total number of ptiles generated by the primary tiling step for each nest passed to it (singly dimensioned to (50)): $N_p$ /STile/

/STile/ contains variables for the storage of the following Secondary tile characteristics, each of which is dimensioned to (50,1080) for the maximum number of possible ptiles that are allowed to pass to the secondary tiling step=50, and the maximum number of stiles generated per each ptile passed=1080.

1. The top ptile's displacement relative to the bottom ptile, to form the secondary the: $dx_s$, $dy_s$, $dz_s$
2. The effective parallelepipe volume used per part: Pv
3. The ranked sequence from best to worst stile for both the ptile passed and the stile for that ptile (singly dimensioned to (50)): $NSeqnc_s$, $Tseqnc_s$
4. The total number of stiles generated by the secondary tiling step for each ptile passed to it (singly dimensioned to (50)): $N_s$ /Layout/

/Layout/ contains variables for the storage of the following Layout characteristics.

1. The nest displacement for the best layout: $dxlay_n$, $dylay_n$, $dzlay_n$
2. The ptile displacement for the best layout: $dxlay_p$, $dylay_p$, $dzlay_p$
3. The stile displacement for the best layout: $dxlay_s$, $dylay_s$, $dzlay_s$
4. The z direction displacement for the best layout: $dxlay_z$, $dylay_z$, $dzlay_z$
5. The smallest effective parallelepipe volume used per part, in the final layout: $Pv_{min}$ Nesting Nesting is the process by which two irregular 3D objects or parts are taken and brought together until they "touch" each other on their periphery. This grouping of two parts is called a "nest". A nest is typically formed from two different parts, but for the pictorial examples that follow the same part is used. The parts are brought towards each other as close together as possible to form a nest as compact as possible.

Figure 15B:
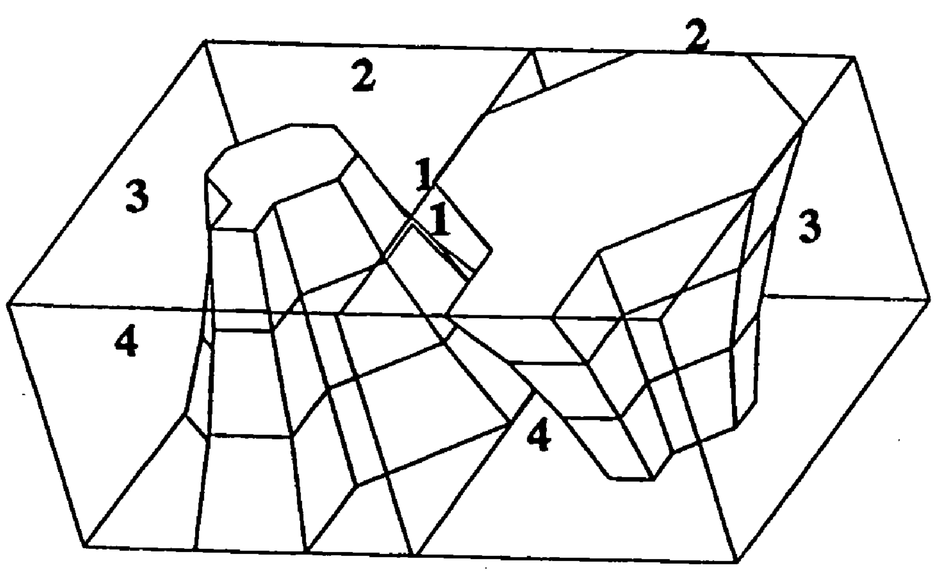
Figure 16A:
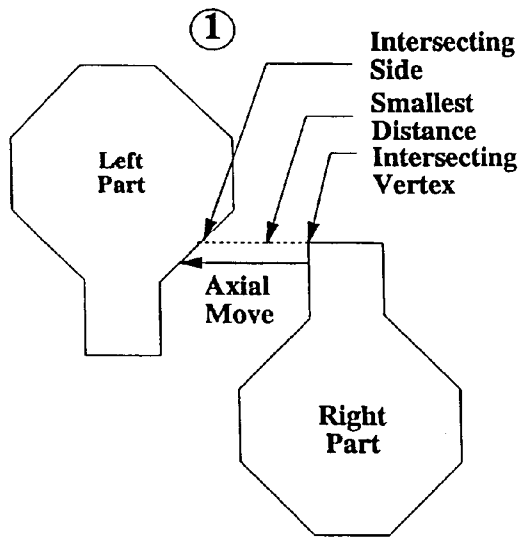
Figure 16B:
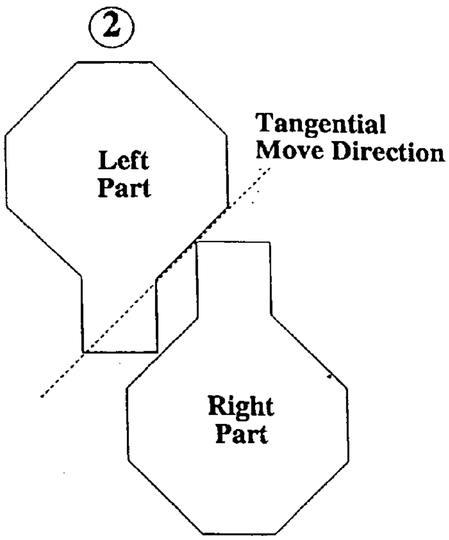
Figure 16C:
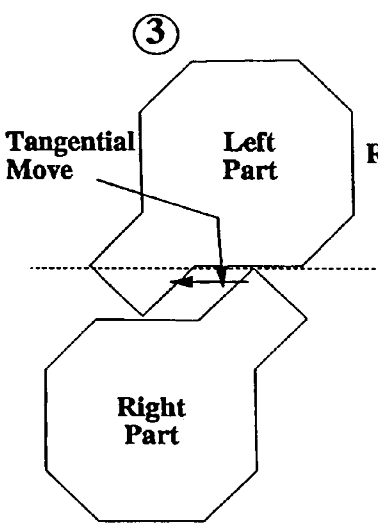
Figure 16D:
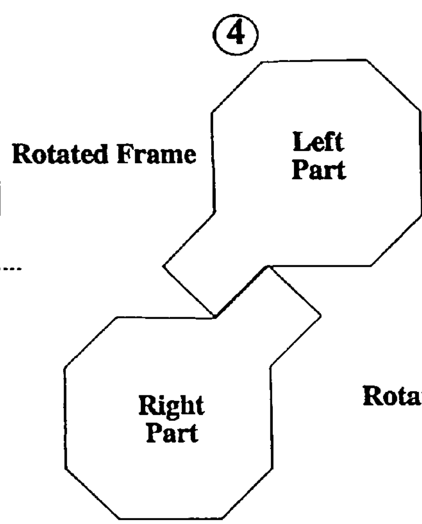
Figure 16E:
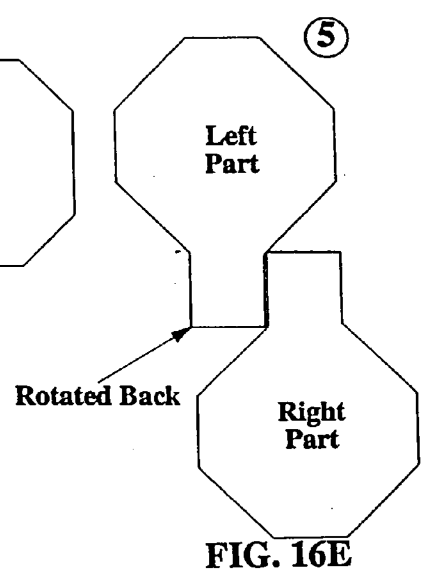

In performing this task in three dimensions, the parts to be nested are first circumscribed inside the smallest possible box. In the illustrated embodiment, the bottom and top z surfaces of the bounding box are not fully nested, but only are stacked; in other embodiments, full nesting (optimal) is performed. The other four lateral faces of this box are numbered from 1 to 4. The program sets up a loop to go through all possible combinations for each face of the left part to be approached by each face of the right part, a total of ten combinations in all. Another ten face-to-face combinations are to accommodate when the right part is "flipped" along the z axis, yielding a total of twenty face combinations used for nesting. FIGS. 15A and 15B illustrate two nest approaches. FIG. 15A shows nesting for sides 1 and 2 (left and right part respectively) and FIG. 15B shows sides 1 and 1 with the right part flipped.

Nesting is accomplished in two steps: (1) an axial move (in the x direction or direction of approach), and (2) a tangential move for the further reduction of the overall volume of the nest. In the illustrated embodiment, the left part of the nest remains static while the right part is iteratively moved towards the left part in search for the maximum approach to it. Since the approach is in the x direction, a grid in the yz plane is first defined that grid contains the starting locations for the right part's approach toward the left part. A total of ten grid locations is implemented in the y direction while in the z direction, in increments of the interleval distance dz are stepped through.

As a result, the total number of yz plane grid points is 10(nzl+nzr−3). Where the maximum number of z cross-section levels allowed per part is 20, there are a maximum of 370 iterative grid points in the yz plane. The number of nests generated (7400) is determined by combining these yz grid points with the number of face to face combinations. For the exemplary object 140, having only 4 cross-sections there are only 50 yz grid points and a total of 1,000 possible nests generated.

The axial move is accomplished by calculating $N_v$ intersection distances from the left part's vertices towards the right part's sides, and $N_v$ intersection distances from the right part's vertices toward the left part's sides. This is performed on each and every z level cross-section plane, preferably using the basic 2D intersection algorithm disclosed in the incorporated reference. The intersection algorythm is executed for every z plane cross-section and for each of the yz plane grid points. The amount that the right part is moved towards the left one is the smallest of the $2 \cdot N_v \cdot N_z$ distances calculated for each of the 7,400 (maximum) nests to be computed.

The tangential move is an adjustment implemented once the axial move has been performed. For the tangential move, the part is displaced with the intersecting vertex along the other part's intersecting side in the direction along that side until another "collision" occurs and a more compact nest is formed. In order to accomplish that move, parts are "rotated" by an angle such that the intersecting side is horizontal, allowing use of the same intersection routine as for the axial move.

FIGS. 16A–16E show the nesting procedure for one of the z cross-section levels. The first step (FIG. 16A) shows the set up before the axial move. The second step (FIG. 16B) shows the geometry after the axial move. The third step (FIG. 16C) shows the geometry after rotation is done so as to render the tangential direction horizontal. At this point, a similar intersection algorithm procedure to the axial move is performed in order to obtain the smallest intersecting line to further approach the right part towards the left one. The fourth step (FIG. 16D) depicts the set up after the right part has been moved, and finally the fifth step (FIG. 16E) shows the final nested situation with the frame of reference rotated back to the original position.

Once the nests are formed their total and partial volume extents are calculated and stored. Then, a sorting of these nests is performed and the nests are sequenced from best to worst by seeking for the smallest volume extents. Weight factors are applied to each of the two heuristic variables in order to determine their individual effectiveness. This process is referred to as Nest Ranking. FIGS. 17A and 17B show two of the better nests formed with the test object 140.

Primary Tiling

Once the nests are formed and ranked, a predetermined number of the nests (the ones that ranked highest) are passed to the primary tiling step. In this step two nests are brought together in the x direction to form a primary tile or "ptile". A ptile is made of two nests or four parts, and the same rational is used to form a ptile as used to form a nest. The primary tiling procedure starts by placing two nests side by side in the x direction. As in the nesting step, the left nest remains static, while the right nest is moved towards the left one as much as possible.

A grid is formed in the yz plane for the iterative approach, with ten grid points in the y direction and a number of z grid points corresponding to all the corresponding intersecting z cross-section levels between the two nests. The maximum number of z grid points 2(Nzl+Nzr−3)−3 is 71. Typically, a few hundred ptiles are generated per each nest passed from the nesting step. As a maximum for the exemplary computer program (only twenty z levels allowed), there are 710 ptiles for every nest. For the test object 140, there are only 70 ptiles per nest. Since the maximum number of nests passed to the primary tiling step is set to 50, a maximum of 3,550 ptiles are generated, but for test object 140, the maximum number of ptiles is 350.

Once the two nests are set up and made ready for axial compression (in the x direction), the intersection algorithm is recalled in order to calculate the smallest distance to approach the right nest towards the left one until any part on the right nest touches any part on the left nest. The computer program numbers the parts set up in this process in the following manner:

Part 1: Left Part—Left Nest
Part 2: Right Part—Left Nest
Part 3: Left Part—Right Nest
Part 4: Right Part—Right Nest The intersection algorithm routine is then performed four times in sequence to check for the smallest axial approach. The routine is called for parts 1 and 3, then for part 1 and 4, then for parts 2 and 3, and finally for parts 2 and 4. This allows determination of the collision of any of the parts on the left nest with any of the parts on the right nest. FIGS. 18A and 18B show first the set up situation for a particular primary tile of test object 140 (FIG. 18A), and then the actual tile achieved (FIG. 18B).

Secondary Tiling

A small percentage of the ptiles formed (a predetermined number) are then passed onto the secondary tiling step. In the secondary tiling step, two ptiles are brought together in the y direction to form a secondary tile or "stile". An stile is made up of two ptiles or four nests, or eight parts. In order to set up the geometry for secondary tiling, first two ptiles are placed on the bottom of the domain. Then one more nest is set up along the top that is to be nested downwards towards the two ptiles near the bottom of the space. The two ptiles on the bottom are composed of parts numbered 1 through 8 from left to right. The two parts making up the nest at the top, are labeled 9 and 10. The top nest (the one to be dynamically moved to form the stile) is positioned according to whether the ptile has downward or upward flow ($dy_p<0$ or $dy_p>0$).

FIG. 19 shows geometry prior to the secondary tiling iteration for the case of $dy_p>0$. In that figure, the top nest is positioned just above the bottom left three nests and to the left of the bottom rightmost nest. The top nest is then iterated on a xz grid in a similar manner as done in the ptile process, except that the x displacement for this grid (as shown on the figure) is equal to the primary tile period. Again the same rational as before is used, and in the process over a thousand different stiles are generated for each of the ptiles passed onto this step from the primary tiling step.

In order to accomplish a y direction secondary tiling, the coordinate system is rotated 90 degrees, and the previously described axial (x direction) intersection algorithm is performed. In this case a check is performed to determine the smallest approach distance between any of the two top parts (part nos. 9 and 10) and any of the six bottom parts (part nos. 1 through 6 for the $dy_p>0$ case). In the case of $dy_p<0$ the top nest is set up just to the right of the bottom leftmost nest. As a result, the intersection test is made between parts 9 and 10 (top nest) and parts 3 through 8 (bottom tiles). The resulting stile is shown in FIG. 20.

Tertiary Tiling/Layout

Performance of the primary and secondary tiling steps yields two numbers: the primary and the secondary tiling period. These numbers represent the displacements in the primary and secondary tiling directions, and replication of as may nests as desired on a skewed plane formation for these parts. For each of these secondary tiles produced, a tertiary tiling is also implemented. In the tertiary tiling process of the illustrated embodiment, secondary tiles are brought together in the z direction using a simple stacking rationale, bringing the stiles no closer than their closest boundaries. In that form, the layout is an inexpensive calculation and can be performed for every stile generated without the need for secondary tile culling. In other forms of the invention, the secondary tiled configuration can be optimally nested into stacks with optimal packing. The latter process can be performed with reduced computational time using the above described heuristic method.

The "stacking" of skewed planes on top of each other is performed by displacing the layers to avoid collisions when nests or tiles have been formed with non-zero z direction displacements.

A simple layout routine takes the data generated for the best tertiary tile and computes the ideal parallelepiped volume needed to contain a single nest. This parallelepiped volume is calculated using the coordinates for the three displacements necessary to form a layout: the primary tiling period ($x_p$, $y_p$, $z_p$), the secondary tiling period ($x_s$, $y_s$, $z_s$) and the displaced z direction stacking period ($x_z$, $y_z$, $z_z$). The volume of the parallelepiped formed is calculated from the following formulae:

$l_p=\sqrt{x_p{}^2+y_p{}^2+z_p{}^2}$ $l_s=\sqrt{x_s{}^2+y_s{}^2+z_s{}^2}$ $l_z=\sqrt{x_z{}^2+y_z{}^2+z_z{}^2}$ $$l_p = \sqrt{x_p^2 + y_p^2 + z_p^2}$$

$$l_s = \sqrt{x_s^2 + y_s^2 + z_s^2}$$

$$l_z = \sqrt{x_z^2 + y_z^2 + z_z^2}$$

$$\cos\theta_{ps} = \frac{x_p x_s + y_p y_s + z_p z_s}{l_p l_s}$$

$$\cos\theta_{pz} = \frac{x_p x_z + y_p y_z + z_p z_z}{l_p l_z}$$

$$\cos\theta_{sz} = \frac{x_s x_z + y_s y_z + z_s z_z}{l_s l_z}$$

$$Vol = l_p l_s l_z \sin\theta_{ps} \sin\theta_{pz} \sin\theta_{sz}$$

A computation of the utilization ratio is determined by calculating the actual part volume and dividing that volume by the needed parallelepiped volume. Then the layout routine creates a file with the 3DCAD commands that generate the best layout for the parts nested.

Performance of the Illustrated Embodiment

EXAMPLE 1

Layout Results Vs Number of Nests/PTiles Kept

The above defined computer system (FIG. 11) and computer program was implemented for the test object 140 of FIG. 12. The number of nests and ptiles kept for passage to further stages of the computation was varied simultaneously between 5 and 50. That is, these two numbers were varied equally ($N_{n\text{-}pt}=N_{pt\text{-}st}$). A variation from 5 to 50 represents more than two orders of magnitude variation in computation time. The programmed computer produced a layout result for only 5 nests/ptiles kept in less than a minute, whereas it produced a layout for 50 nests/ ptile in approximately one hour.

The test object 140 tested is a very simple one with only a few vertices and cross-section levels to describe it. More complex parts may have typically 10 times more vertices and say 5 times more cross-sections to describe it. This fifty-fold increase in computation time means that for a small number of nests/ptiles kept, the computer processing time will now be on the order of an hour, whereas for the large number of nests/ptiles kept, the numerical solution could typically take many hours. Even with the use of faster computers (e.g., a ten fold increase in speed), a long wait would be expected for a 3D layout. The heuristic nest culling process, achieves near optimal layout utilization efficiencies, while using much smaller computation times.

The following table shows volume utilization using the configuration of this example, the number of nests/ptiles kept for the test object 140.

| $N_{n\text{-}pt}$ | $N_{pt\text{-}st}$ | Percent Volume Utilization |
|---|---|---|
| 5 | 5 | 35% |
| 10 | 10 | 41% |
| 20 | 20 | 42% |
| 50 | 50 | 42% |

The data in the above table suggests that, keeping 20 nests is all that is needed in order to achieve near optimal results. More complex parts will also require a larger number of nests/ptiles kept for passage onto higher stages in the computation.

The three layouts produced for the three cases of 5, 10 and 20 nests/ptiles kept are shown in FIGS. 21–23. The N=10 case (FIG. 22) used a different nest than the N=5 case (FIG. 21) and yielded an increase in efficiency of 6%. The N=20 case (FIG. 23) kept the same nest used in the N=10 case but used a more efficient ptile (which was not kept within the ten limitation) in order to increase the utilization efficiency another 1%. In order to achieve near optimal volume utilization, the weighting factors of the two heuristic variables can be varied in order to ascertain their relative relevance. Other heuristics can also be used to further shorten computation times, while improving the utilization efficiency.

In other embodiments, the computer program incorporates z face nesting and tiling as well as lateral nesting tiling. The tangential move of the nesting step is used in both the primary and second tiling steps to produce even more compact layouts. A full intersecting tertiary tiling step (as opposed to the simple "semi-stacking" tiling procedure) can also be used for improved layouts. A more complex 3D part description may be used, permitting multiple connected cross-sections into the geometric algorithms of the numerical calculation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Method defining a packing configuration for a plurality of two dimensional (2D) objects in a target plane, comprising the computer generated steps of:

A. generating signals defining each of said 2D objects with respect to an object coordinate system having orthogonal axes $X_0$ and $Y_0$, in terms of a plurality of points representative of boundary points on said objects, B. associating two of said objects to define an object pair, C. generating a nest signal representation of said objects of said object pair nested with respect to a nest coordinate system having orthogonal axes $X_N$ and $Y_N$, to define a plurality of close-packed candidate nests in which the pairwise positions of two said objects of each candidate nest are characterized by relatively small planar spaces between the respective objects, D. selecting a subset of said candidate nests in accordance with predetermined nest criteria, E. for each of said selected candidate nests, generating a tile signal representative of two such nests tiled with respect to a tile coordinate system having orthogonal axes $X_T$ and $Y_T$, said tiling steps including the sub steps of:

i. generating a primary tile signal representative of said two nests tiled with respect to said $X_T$ axis by translating said nests with relative motion in the direction of said $X_T$ and $Y_T$ axes, to define a plurality of candidate primary tiles in which the pairwise positions of said two nests of each candidate primary tile are characterized by relatively small planar spaces between said nests, ii. selecting a subset of said candidate primary tiles in accordance with predetermined primary tile criteria, iii. for each of said selected primary tiles, generating a secondary tile signal representative of a nest and said primary tile tiled with respect to said $Y_T$ axis by translating said nest with respect to said primary tile with relative motion in the direction of said $X_T$ and $Y_T$ axes, to define a plurality of candidate secondary tiles in which the pairwise positions of said nest and said primary tile are characterized by relatively small planar spaces between said nest and the nests of said primary tile, iv. selecting one of said candidate secondary tiles in accordance with predetermined secondary tile criteria, thereby defining the optimal nest and primary tile, said optimal nest defining said packing configuration.

2. The method according to claim 1 comprising the further steps of:

F. generating an initial tile signal representative of an initial secondary tile positioned in said target plane at a position other than adjacent the boundary of said target plane, and G. generating an area packing signal representative of said initial tile as augmented additional secondary tile extending successively from said initial secondary tile in the direction of each of said $X_T$, and $Y_T$ axes, whereby adjacent secondary tiles are substantially identically pairwise configured in said target plane in the direction of said $X_T$ and $Y_T$ axes.

3. A system for defining a packing configuration for a plurality of two dimensional (2D) objects in a target plane, comprising:

A. means for generating signals defining each of said 2D objects with respect to an object coordinate system having orthogonal axes $X_0$ and $Y_0$, in terms of a plurality of points representative of boundary points on said objects, B. means for associating two of said objects to define an object pair, C. means for generating a nest signal representation of said objects of said object pair nested with respect to a nest coordinate system having orthogonal axes $X_N$ and $Y_N$, to define a plurality of close-packed candidate nests in which the pairwise positions of two said objects of each candidate nest are characterized by relatively small planar spaces between the respective objects, D. means for selecting a subset of said candidate nests in accordance with predetermined nest criteria, E. tiling means operative for each of said selected candidate nests, for generating a tile signal representative of two such nests tiled with respect to a tile coordinate system having orthogonal axes $X_T$ and $Y_T$, said tiling means including:

i. means for generating a primary tile signal representative of said two nests tiled with respect to said $X_T$ axis by translating said nests with relative motion in the direction of said $X_T$ and $Y_T$ axes, to define a plurality of candidate primary tiles in which the pairwise positions of said two nests of each candidate primary tile are characterized by relatively small planar spaces between said nests, ii. means for selecting a subset of said candidate primary tiles in accordance with predetermined primary tile criteria, iii. means operative for each of said selected primary tiles, for generating a secondary tile signal representative of a nest and said primary tile tiled with respect to said $Y_T$ axis by translating said nest with respect to said primary tile with relative motion in the direction of said $X_T$ and $Y_T$ axes, to define a plurality of candidate secondary tiles in which the pairwise positions of said nest and said primary tile are characterized by relatively small planar spaces between said nest and the nests of said primary tile, iv. means for selecting one of said candidate secondary tiles in accordance with predetermined secondary tile criteria, thereby defining the optimal nest and primary tile, said optimal nest defining said packing configuration.

4. The system according to claim 3 further comprising:

F. means for generating an initial tile signal representative of an initial secondary tile positioned in said target plane at a position other than adjacent the boundary of said target plane, and G. means for generating an area packing signal representative of said initial tile as an augmented additional secondary tile extending successively from said initial secondary tile in the direction of each of said $X_T$, and $Y_T$ axes, whereby adjacent secondary tiles are substantially identically pairwise configured in said target plane in the direction of said $X_T$ and $Y_T$ axes.

5. Method of defining a packing configuration for a plurality of three dimensional (3D) objects in a target volume, comprising the computer generated steps of:

A. generating an object signal defining each of said 3D objects with respect to an object coordinate system having orthogonal axes $X_0$, $Y_0$ and $Z_0$, in terms of a plurality of points representative of boundary points on said objects, B. associating two of said objects to define an object pair, C. generating a nest signal representative of said objects of said object pair nested with respect to a nest coordinate system having orthogonal axes $X_N$ , $Y_N$ and $Z_N$, to define a plurality of close-packed candidate nests in which the pairwise positions of said objects of each candidate nest are characterized by relatively small volumetric spaces between the respective objects, D. selecting a subset of said candidate nests in accordance with predetermined nest criteria, E. for each of said selected candidate nests, generating a tile signal representative of two of said nests tiled with respect to a tile coordinate system having orthogonal axes $X_T$, $Y_T$ and $Z_T$, said tile generating step including the sub steps of:

i. generating a primary tile signal representative of said two nests tiled with respect to said $X_T$ axis by translating said nests with relative motion in the direction of said $X_T$, $Y_T$ and $Z_T$ axes, to define a plurality of candidate primary tiles in which the pairwise positions of said two nests of each candidate primary tile are characterized by relatively small volumetric spaces between said nests, ii. selecting a subset of said candidate primary tiles in accordance with predetermined primary tile criteria, iii. for each of said selected primary tiles, generating a secondary tile signal representative of one of said nests of said primary tiles and said primary tile tiled with respect to said $Y_T$ axis by translating said nest with respect to said primary tile with relative motion in the direction of said $X_T$, $Y_T$ and $Z_T$ axes, to define a plurality of candidate secondary tiles in which the pairwise positions of said nest and said primary tile are characterized by relatively small volumetric spaces between said nest and the nests of said primary tile, iv. selecting one of said candidate secondary tiles in accordance with predetermined secondary tile criteria, v. for each of said selected secondary tiles, generating a tertiary tile signal representative of two of said secondary tiles tiled with respect to said $Z_T$ axis by translating said secondary tiles with respect to each other with relative motion of in the direction of said $X_T$, $Y_T$, and $Z_T$ axes to define a plurality of tertiary tiles in which the pairwise positions of said secondary tiles are characterized by relatively small volumetric spaces between said secondary tiles, vi. selecting one of said tertiary tiles from said candidate tertiary tiles in accordance with predetermined tertiary tile criteria, thereby defining an optimal nest of said primary tile and said secondary tile, said optimal nest defining said packing configuration.

6. The method according to claim 5 comprising the further step of

F. generating an initial tile signal representative of an initial tertiary tile positioned in said target volume at a position other than adjacent the boundary of said target volume, and G. generating a volume packing signal representative of said initial tile as augmented additional tertiary tiles extending successively from said initial tertiary tile in the direction of each of said $X_T$, $Y_T$, and $Z_T$ axes, whereby adjacent tertiary tiles are substantially identically pairwise configured in said target volume in the direction of said $X_T$, $Y_T$, and $Z_T$ axes.

* * * * *